（12） United States Patent
Nandi et al.

(10) Patent No.: US 11,735,933 B2
(45) Date of Patent: Aug. 22, 2023

(54) RECTIFICATION BY BATTERY PROTECTION SYSTEM

(71) Applicant: TEXAS INSTRUMENTS INCORPORATED, Dallas, TX (US)

(72) Inventors: Prajit Nandi, Kolkata (IN); Vasishta Kidambi, Atlanta, GA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 106 days.

(21) Appl. No.: 17/513,746

(22) Filed: Oct. 28, 2021

(65) Prior Publication Data

US 2023/0136026 A1    May 4, 2023

(51) Int. Cl.
*H02J 7/00* (2006.01)
(52) U.S. Cl.
CPC ........... *H02J 7/0034* (2013.01); *H02J 7/0031* (2013.01)
(58) Field of Classification Search
CPC .............................. H02J 7/0031; H02J 7/0034
USPC ........................................................... 361/84
See application file for complete search history.

(56) References Cited

U.S. PATENT DOCUMENTS

| 2018/0109187 A1* | 4/2018 | Eggermont | G01R 19/08 |
| 2020/0251907 A1* | 8/2020 | Hester | G05F 1/67 |
| 2021/0336544 A1* | 10/2021 | Wang | H02M 1/08 |
| 2022/0209667 A1* | 6/2022 | Neidorff | H02M 1/08 |

* cited by examiner

*Primary Examiner* — Yemane Mehari
(74) *Attorney, Agent, or Firm* — Charles F. Koch; Frank D. Cimino

(57) ABSTRACT

In some examples, a controller circuit comprises: a voltage subtractor circuit having a subtractor output and first and second subtractor inputs, the first subtractor input adapted to be coupled to a first current terminal of a transistor, and the second subtractor input adapted to be coupled to a second current terminal of the transistor; an internal voltage generator circuit having a generator input and a generator output, the generator input adapted to be coupled to the first current terminal; and a gate control circuit having a gate control input and a gate control output, the gate control input coupled to the subtractor output, the gate control output adapted to be coupled to a gate of the transistor, the gate control circuit including a switch coupled between the gate control output and the generator output.

20 Claims, 14 Drawing Sheets

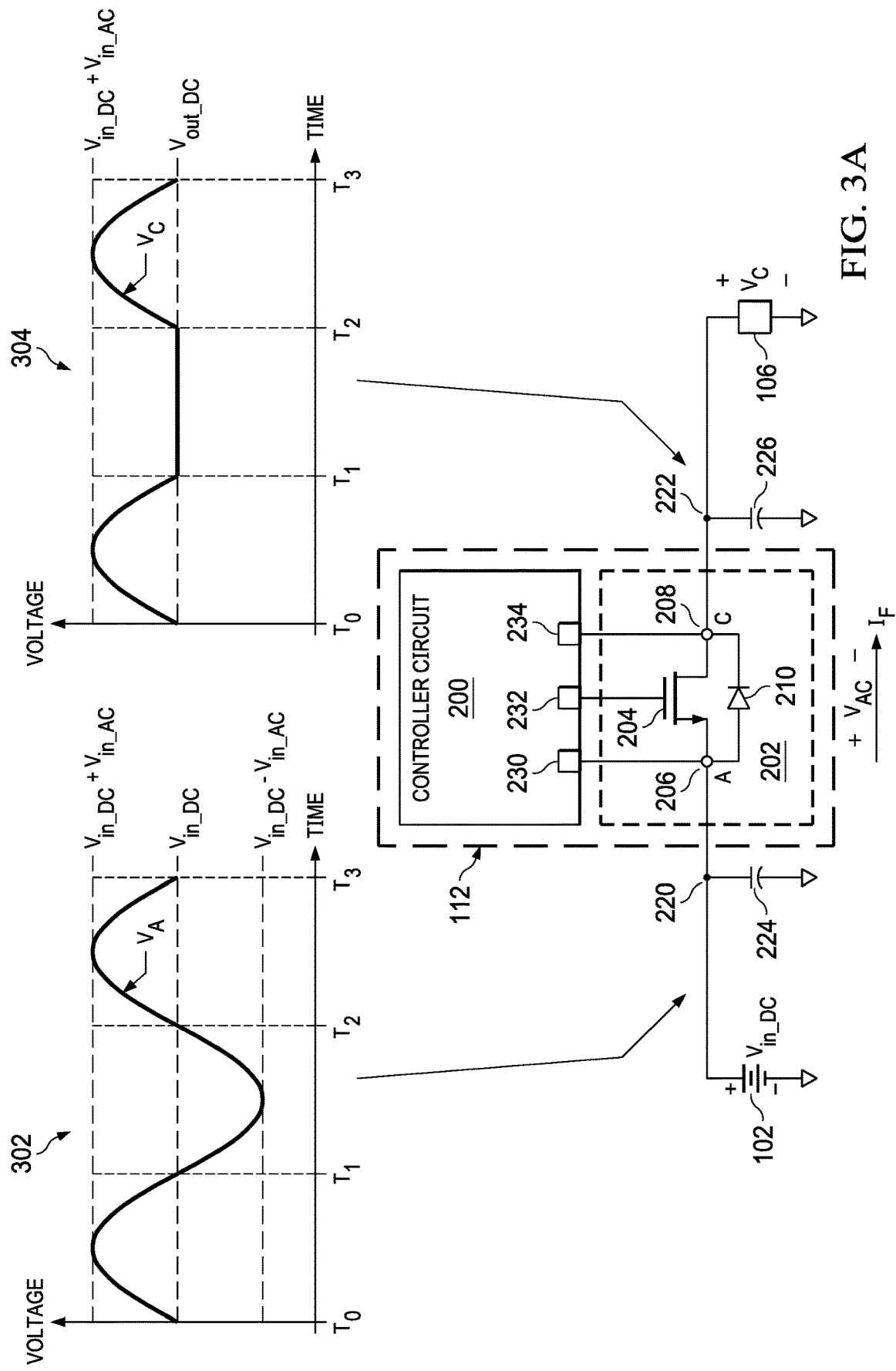

RECTIFICATION BY BATTERY PROTECTION SYSTEM

BACKGROUND

An electric power system that transfers electric power from a battery to a load may include a protection system to protect the load from a reverse battery connection, where the load may receive a negative input voltage from the battery. The protection system can isolate the load from the negative input voltage to prevent the load from being damaged by the negative input voltage. Some examples of the protection system can also block a reverse current from flowing from the load to the battery, to allow the load side additional time to operate before turning off. While the battery may output a direct current (DC) signal, the battery outputs may also include alternating current (AC) signals superimposed on the DC signal. It is also desirable that the protection system can have a short response time, so that the protection system can properly and promptly respond to transient signals output by the battery to protect the load.

SUMMARY

A controller circuit includes a voltage subtractor circuit, an internal voltage generator circuit, and a gate control circuit. The voltage subtractor circuit has a subtractor output and first and second subtractor inputs. The first subtractor input is adapted to be coupled to a first current terminal of a transistor. The second subtractor input is adapted to be coupled to a second current terminal of the transistor. The internal voltage generator circuit has a generator input and a generator output. The generator input is adapted to be coupled to the first current terminal. The gate control circuit has a first gate control input, a second gate control input, and a gate control output. The first gate control input is coupled to the subtractor output. The second gate control input is coupled to the generator output. The gate control output is adapted to be coupled to a gate of the transistor. The gate control circuit also includes a switch coupled between the gate control output and the second gate control input.

In a method, a first voltage is received via a first terminal of a controller circuit, the first terminal being coupled to a first current terminal of a transistor. A second voltage is received via a second terminal of the controller circuit, the second terminal being coupled to a second diffusion of the transistor. Based on the first voltage and the second voltage, a switch between a voltage reference and a third terminal of the controller circuit coupled to a gate of the transistor is closed. A voltage of the gate is set by the voltage reference to form a conduction channel between the first current terminal and the second current terminal.

BRIEF DESCRIPTION OF THE DRAWINGS

FIGS. 3A, 3B, and 3C illustrate examples of rectification operations performed by the protection system of FIG. 2A-FIG. 2F.

DETAILED DESCRIPTION

As described above, an electric power system may include a protection system to protect the load from a reverse battery connection. In a case where the electric power system is part of a vehicle, reverse battery connection may occur during maintenance of the vehicle's battery or jump start of the vehicle. Without the protection system, the load may receive a negative voltage from the battery when the battery is reversely connected. The negative voltage can cause huge current to flow from various electronic components of the load, such as electrostatic discharge (ESD) circuits, voltage regulators, etc., which can cause severe damage to these components.

The protection system can include a controller circuit and a transistor. The transistor can include a body diode, of which the anode can be coupled to the battery and the cathode can be coupled to the load. In a reverse battery connection, the battery may output a negative voltage, and the controller circuit can disable the transistor and rely on the reversed-bias body diode to isolate the load from the negative voltage, and to prevent a reverse current from flowing from the load back to the battery. If the battery is connected in the correct polarities, the controller circuit can enable the transistor to transmit a positive voltage and a forward current from the battery to the load. In a case where the anode receives a voltage including both DC and AC components, the protection system can perform a rectification operation to transmit positive AC components (e.g., AC components that adds to the DC component) and not to transmit negative AC components (e.g., AC components that subtracts from the DC component) to the load. For reasons to be described below, the controller circuit may incur substantial delay to enable the transistor, which makes it difficult to perform rectification operations for high frequency AC components. Example techniques described herein speed up the rectification response of the controller circuit, which allows the protection system to perform rectification operations for AC components at a high frequency (e.g., 200 kilo-Hertz (kHz) or above).

Figure 1:
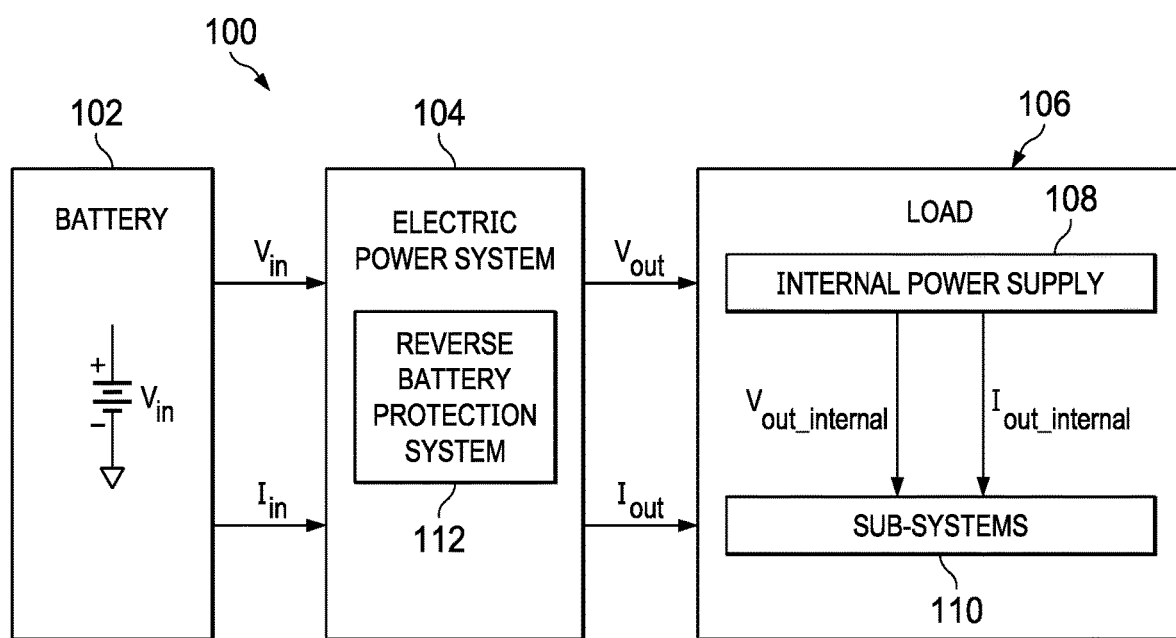
FIG. 1 is a schematic diagram of an electric power transfer system in accordance with various examples.

FIG. 1 illustrates an example of a system 100. System 100 may include a battery 102, an electric power system 104, and a load 106. Load 106 may include an internal power supply 108, which can include a linear regulator (e.g., a low dropout regulator) and/or a switch mode regulator (e.g., a buck converter, a boost converter, a buck-boost converter, etc.) to provide a supply voltage, and a holdup capacitor to supply a current. Load 106 may further include subsystems 110 that draw power from internal power supply 108. Both internal power supply 108 and subsystems 110 can include various electronic components.

Electric power system 104 is configured to transfer electric power from battery 102 to load 106. Electric power system 104 may receive a voltage $V_{in}$ and a current $I_{in}$, and provide a voltage $V_{out}$ and a current $I_{out}$ to load 106. Internal power supply 108 can receive voltage $V_{out}$ and current $I_{out}$ from electric power system 104 and provide a voltage $V_{out}$ internal and a current $I_{out\_internal}$ to subsystems 110. Voltage $V_{out}$ and current $I_{out}$ provided by electric power system 104 can be based on, respectively, voltage $V_{in}$ and current $I_{in}$ provided by battery 102. Also, voltage $V_{out\_internal}$ and current $I_{out\_internal}$ can be based on a configuration of internal power supply 108 and subsystems 110. For example, $V_{out\_internal}$ can be a fraction of $V_{out}$ to provide a reduced supply voltage required by subsystems 110, and $I_{out\_internal}$ can be reduced from $I_{in}$ due to power consumption by electric power system 104 and internal power supply 108. In FIG. 1, the positive terminal of battery 102 can be coupled to electric power system 104 to supply a positive voltage $V_{in}$, while the negative terminal of battery 102 can be coupled to ground. With such configuration, voltages $V_{out}$ and $V_{out\_internal}$ can be positive, and currents $I_{in}$, $I_{out}$, and $I_{out\_internal}$ can be part of a forward current that flows from battery 102 to load 106.

In some examples, electric power system 104 can include a reverse battery protection system 112 to protect load 106 from a reverse battery connection, where the positive terminal of battery 102 is coupled to ground and the negative terminal of battery 102 is coupled to electric power system 104. As a result, battery 102 may transmit a negative voltage, such as $-V_{in}$, to electric power system 104. Without reverse battery protection system 112, electric power system may transmit the negative voltage to load 106. The negative voltage can cause a huge current to flow from various electronic components of load 106, such as electrostatic discharge (ESD) circuits, voltage regulators of internal power supply 108, etc., which can cause severe damage to these components. Moreover, a reverse current may also flow from load 106 back to battery 102. The reverse current may discharge the holdup capacitor of internal power supply 108 and reduces the holdup capacitor's capability of supplying power to subsystems 110. Reverse battery protection system 112 can isolate load 106 from the negative voltage $-V_{in}$. In some examples, reverse battery protection system 112 can also block the reverse current from flowing from load 106 to battery 102, to allow subsystems 110 additional time to operate before turning off.

FIGS. 2A through 2F illustrate examples of internal components of reverse battery protection system 112 of system 100 and their operations. Referring to the left side of FIG. 2A, reverse battery protection system 112 can include a controller circuit 200 and a transistor 202. Transistor 202 can be an n-channel FET (NFET) or a p-channel FET (PFET). Transistor 202 can have a gate 204, a first current terminal 206, and a second current terminal 208. A body diode 210 can be formed at a p-n junction between first current terminal 206 and second current terminal 208, with first current terminal 206 being an anode (denoted "A" in the figures) and second current terminal 208 being a cathode (denoted "C" in the figures). In a case where transistor 202 is an NFET, first current terminal 206 can be a source whereas second current terminal 208 can be a drain. In a case where transistor 202 is a PFET, first current terminal 206 can be a drain whereas second current terminal 208 can be a source. In system 100, first current terminal 206 can be coupled to battery 102 at a node 220, and second current terminal 208 can be coupled to load 106 at a node 222.

Figure 2A:
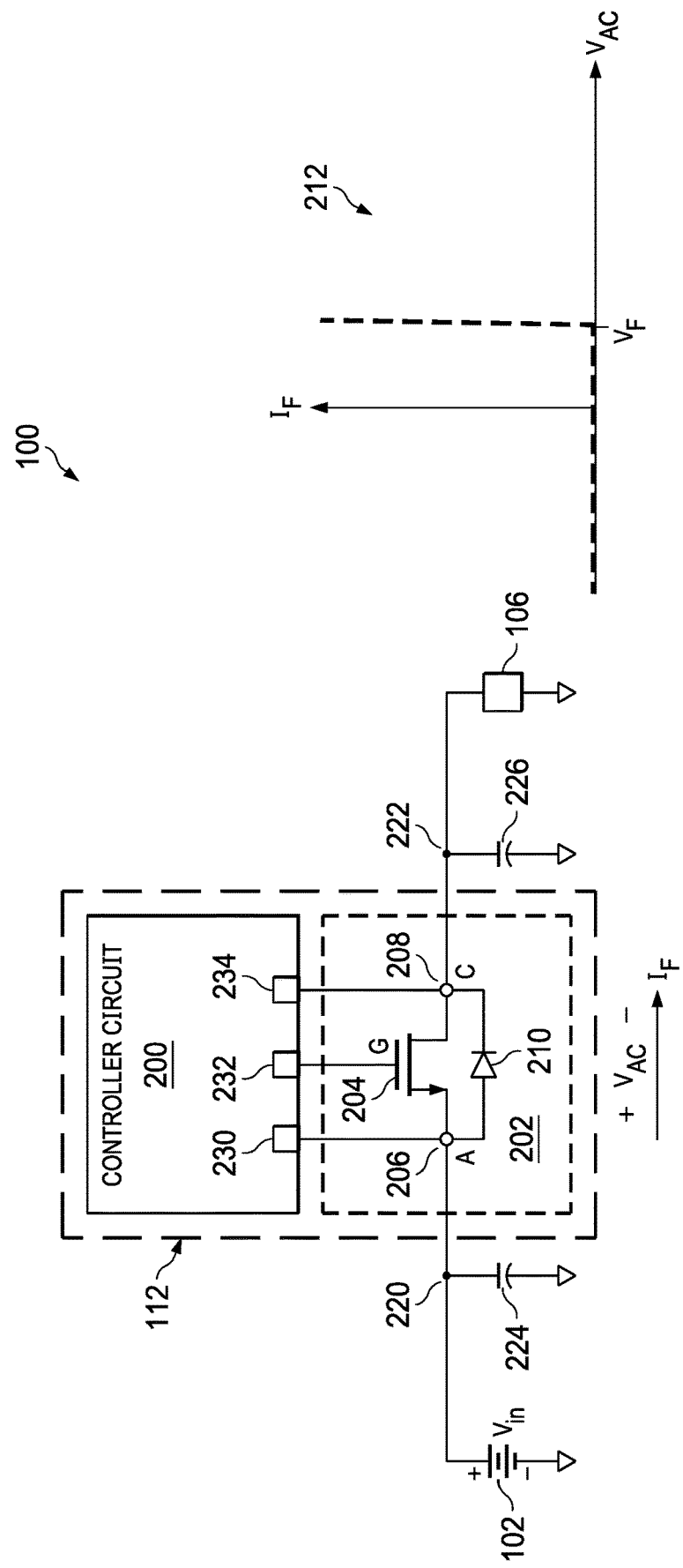
FIGS. 2A through 2F illustrate examples of internal components of a protection system and their operations.

In FIG. 2A, system 100 may include a capacitor 224 and a capacitor 226. Capacitor 224 can model a combination of parasitic capacitances at node 220, such as capacitances of wires and electrical connectors between battery 102 and transistor 202, the junction capacitance at first current terminal 206, etc. Moreover, capacitor 226 can model a combination of parasitic capacitances at node 222, such as capacitances of wires and electrical connectors between load 106 and transistor 202, the junction capacitance at second current terminal 208, etc. Capacitor 226 can also include a physical hold up capacitor to provide a temporary power supply to load 106 when transistor 202 is disabled.

Transistor 202 can be coupled to and controlled by controller circuit 200 to emulate an ideal diode having the same anode and cathode as body diode 210. In some examples, controller circuit 200 can include a terminal 230 adapted to be coupled to first current terminal 206. First current terminal 206 can be the anode of the ideal diode. Controller circuit 200 can also include a terminal 232 adapted to be coupled to gate 204 of transistor 202, and a terminal 234 adapted to be coupled to second current terminal 208 of transistor 202. Second current terminal 208 can be the cathode of the ideal diode. Terminals 230, 232, and 234 can include interconnects (e.g., chip-chip interconnects, traces on printed circuit board (PCB), etc.) that allow signals (e.g., current, voltage, etc.) to flow between controller circuit 200 and transistor 202. Controller circuit 200 can monitor the anode voltage $V_A$ at first current terminal 206 and the cathode voltage $V_C$ at second current terminal 208, and adjust the voltage of gate 204 of transistor 202 via terminal 232 responsive to changes of the anode-cathode voltage $V_{AC}$ to emulate an ideal diode coupled between battery 102 and load 106.

The right side of FIG. 2A illustrates an example transfer function graph 212 of an ideal diode to be emulated by transistor 202. Transfer function graph 212 illustrates a relationship between the amount of a forward current $I_F$ conducted by the diode, from anode to cathode, with respect a difference voltage between the anode and cathode $V_{AC}$. If $V_{AC}$ is below a forward voltage $V_F$, the diode can be reverse-biased, and no forward current (or a minimum amount of forward current) flows through the diode. If $V_{AC}$ is above the forward voltage $V_F$, the diode is forward bias and can conduct a forward current $I_F$. When the diode is forward-biased, the anode-cathode voltage $V_{AC}$ can remain constant at $V_F$ independent of the amount of forward current $I_F$ being conducted, so that the cathode voltage $V_C$ can be equal to the anode voltage $V_A$ minus the forward voltage $V_F$.

To emulate the ideal diode, in a case where $V_{AC}$ is above a forward voltage threshold representing the forward voltage of the ideal diode, controller circuit 200 can increase the gate-source voltage ($V_{GS}$) of transistor 202 (if transistor 202 is an NFET), or the source-gate voltage ($V_{SG}$) of transistor 202 (if transistor 202 is a PFET), to be above a threshold voltage $V_{th}$ of the transistor. Raising $V_{GS}$ ($V_{SG}$) to above $V_{th}$ can turn on/enable transistor 202 by forming a conduction channel between first current terminal 206 and second current terminal 208 under gate 204. The conduction channel can transmit a positive voltage and a forward/positive current from battery 102 to load 106. However, in a case where $V_{AC}$ is below the forward voltage threshold, controller circuit 200 can reduce the gate-source voltage $V_{GS}$ (if transistor 202 is NFET) or source-gate voltage $V_{SG}$ (if transistor 202 is PFET) to be below the threshold voltage $V_{th}$. Dropping $V_{GS}$ (or $V_{SG}$) below $V_{th}$ can turn off/disable transistor 202 by removing (or at least reducing) the conduction channel. Body diode 210 is reverse-biased due to $V_{AC}$ being below the forward voltage threshold, and the reverse-biased body diode can block a negative voltage and a reverse/negative current from reaching load 106 from battery 102.

Although transfer function graph 212 shows that an ideal diode has a single forward voltage $V_F$, in some examples controller circuit 200 can enable a conduction channel of transistor 202 (between first current terminal 206 and second current terminal 208) in response to $V_{AC}$ exceeding multiple thresholds, which can indicate that the battery is connected with the correct polarity. Controller circuit 200 can also disable/remove the conduction channel of transistor 202 to block a reverse current/negative voltage in response to $V_{AC}$ being below a reverse bias threshold, which can indicate a reverse battery connection. Such arrangements can improve the robustness of system 100 in light of transient noises.

Figure 2B:
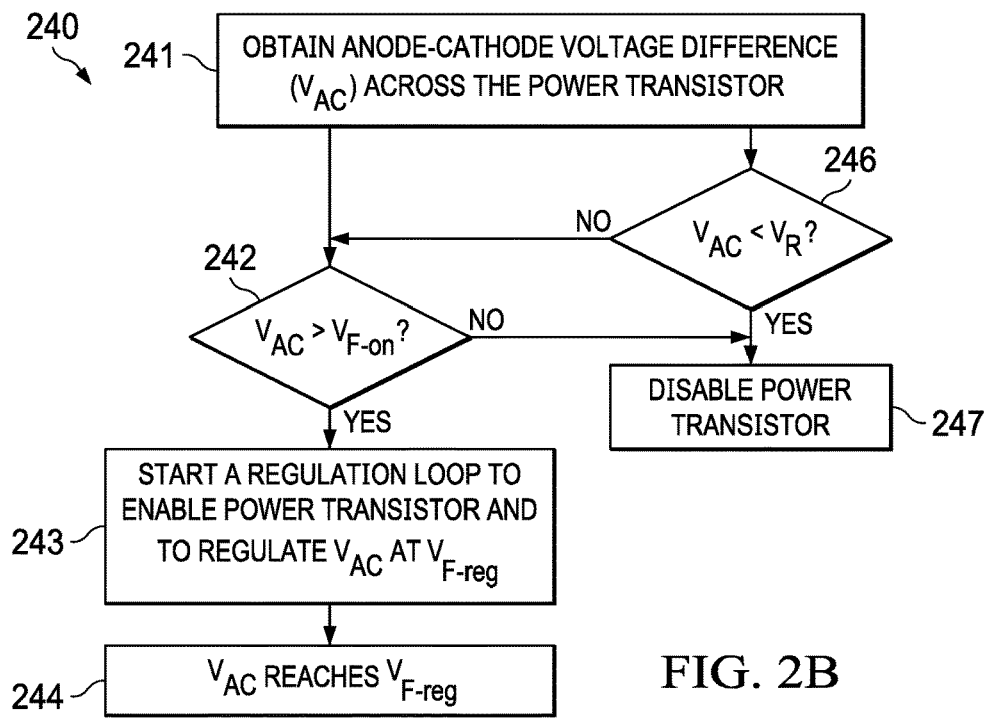

FIG. 2B illustrates a flowchart of an example method 240 performed by controller circuit 200 in controlling transistor 202. Method 240 can be performed after controller circuit 200 starts up and has not yet started enabled transistor 202.

In step 241, controller circuit 200 can determine an anode-cathode voltage ($V_{ac}$) across transistor 202. Controller circuit 200 can monitor the anode voltage ($V_A$) at terminal 230 and the cathode voltage ($V_C$) at terminal 234. Controller circuit 200 can include a subtraction circuit (e.g., implemented using a differential amplifier) to subtract $V_C$ from $V_A$ to obtain $V_{AC}$.

Controller circuit 200 can then proceed to compare $V_{AC}$ with a forward conduction threshold voltage $V_{F\text{-}on}$, in step 242. If $V_{AC}$ exceeds $V_{F\text{-}on}$, controller circuit 200 can start a regulation loop to raise the gate-source voltage $V_{GS}$ (or $V_{SG}$ if transistor 202 is PFET) to enable a conduction channel of transistor 202, and to regulate $V_{AC}$ at a target forward voltage $V_{F\text{-}reg}$, in step 243. $V_{F\text{-}reg}$ can represent $V_F$ of an ideal diode in transfer function graph 212 of FIG. 2A, and transistor 202 can be controlled to emulate a forward-biased diode. In step 244, $V_{AC}$ reaches (and can be regulated at $V_{F\text{-}reg}$.

The forward conduction threshold voltage $V_{F\text{-}on}$ can be made higher than $V_{F\text{-}reg}$. By having $V_{AC}$ to be higher than $V_{F\text{-}on}$ (and to be much higher than $V_{F\text{-}reg}$) to start the forward conduction, the likelihood of mistaking a transient noise at node 220 as a positive voltage supplied by battery 102, and falsely enabling transistor 202 as a result, can be reduced. The target forward voltage $V_{F\text{-}reg}$ can be regulated at a lower voltage than $V_{F\text{-}on}$ to reduce voltage drop and power loss across transistor 202 when emulating the forward-biased diode.

Also, controller circuit 200 can compare $V_{AC}$ with a reverse bias threshold voltage $V_R$, in step 246, to detect a reverse battery connection. The reverse bias threshold voltage $V_R$ can be a negative voltage that can be received from the negative terminal of battery 102 when the polarity of battery 102 is reversed. Therefore, comparing $V_{AC}$ against a negative voltage to detect a reverse battery connection can reduce the likelihood of false detection of reverse battery connection, such as caused by a transient voltage at node 220. If $V_{AC}$ is below $V_R$, which can indicate a reverse battery connection, or if $V_{AC}$ is above $V_R$ but below $V_{F\text{-}on}$, which can indicate a small transient voltage rather than a large positive voltage supplied by battery 102, controller circuit 200 can maintain transistor 202 in a disabled state, in step 247. In a case where transistor 202 is disabled and the conduction channel is removed, the reverse-biased body diode 210 can block a negative voltage/a reverse current.

Figure 2C:
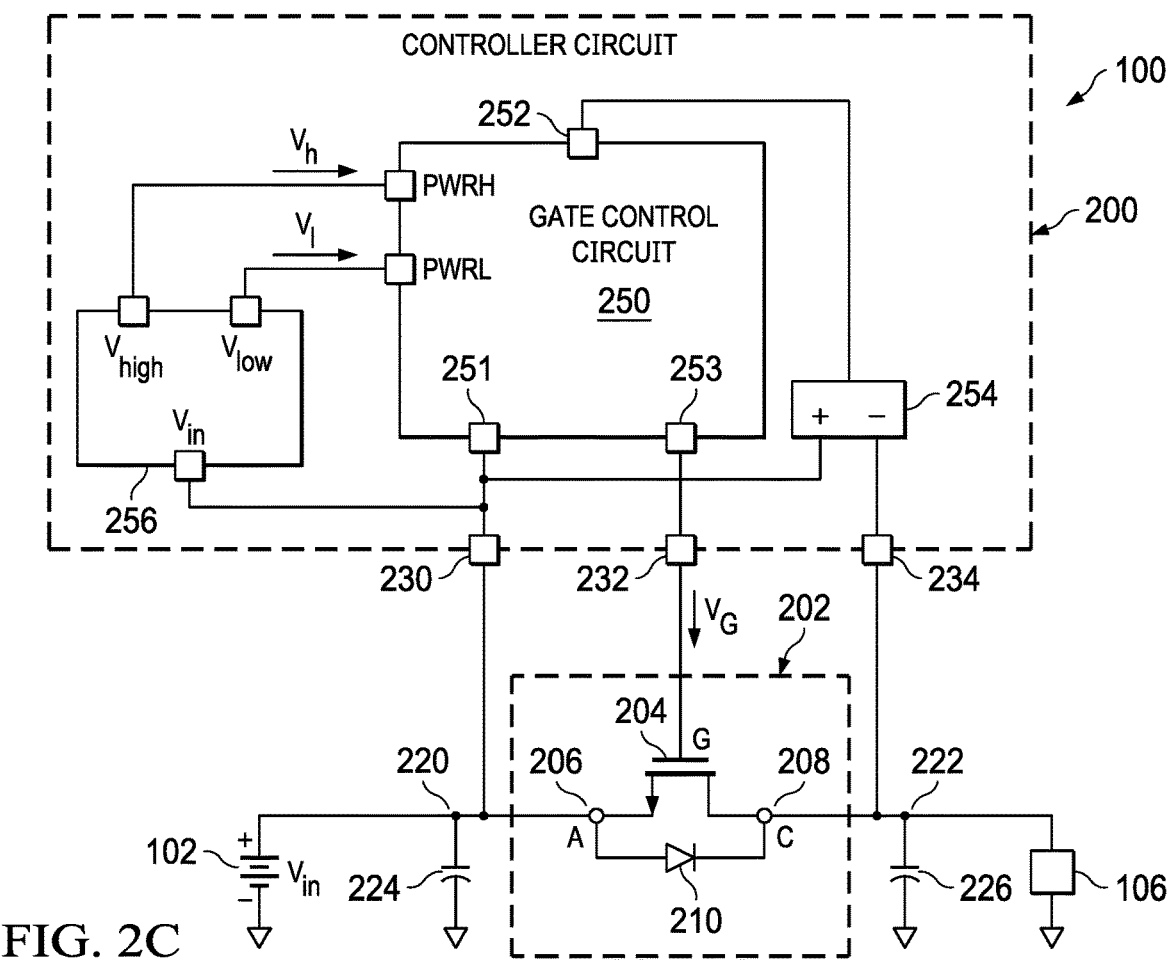

FIG. 2C illustrates examples of internal components of controller circuit 200. Referring to FIG. 2B, controller circuit 200 can include a gate control circuit 250. Gate control circuit 250 can include an input 251, an input 252, and an output 253. Input 251 can be adapted to be coupled to first current terminal 206 of transistor 202, which can be the anode of the diode to be emulated, via terminal 230. Output 253 can be adapted to be coupled to gate 204 via terminal 232. Controller circuit 200 further includes a voltage subtractor circuit 254, which can include an op-amp subtractor or other suitable circuits, to receive an anode voltage $V_A$ via terminal 230 and a cathode voltage $V_C$ via terminal 234, generate an anode-cathode voltage $V_{AC}$ representing a difference between $V_A$ and $V_C$, and provide $V_{AC}$ to input 252 of gate control circuit 250. Gate control circuit 250 can generate a gate voltage signal $V_G$ in response to $V_{AC}$, based on the techniques described in method 240 of FIG. 2B, and provide gate voltage signal $V_G$ via output 253 and terminal 232 to enable transistor 202 to conduct a forward current from the anode to the cathode (and from battery 102 to load 106), or to disable transistor 202 to block the flow of a reverse current from the cathode back to the anode (and from load 106 back to battery 102).

Also, controller circuit 200 can include a local voltage generator circuit 256 to generate local voltages. Local voltage generator circuit 256 can receive the anode voltage, which can be a positive voltage provided by battery 102, via terminal 230 as an input ($V_{in}$). Local voltage generator circuit 256 can provide a high supply voltage ($V_h$) to a high power supply terminal (labelled "PWRH" in FIG. 2C) of gate control circuit 250, and a low supply voltage ($V_l$) to a low power supply terminal (labelled "PWRL" in FIG. 2C) of gate control circuit 250. The high supply voltage and the low supply voltage can be generated from the anode voltage $V_A$ and supplied to gate control circuit 250 to reduce the drain-source voltages (VDS) of devices of gate control circuit 250 and the resulting voltage stress. Local voltage generator circuit 256 can include a charge pump to generate the high supply voltage $V_h$ by adding an offset voltage to the anode voltage $V_A$. Local voltage generator circuit 256 can also include a linear regulator, such as a floating-rail low drop out (LDO) regulator, to generate the low supply voltage Vi by subtracting an offset voltage from the anode voltage $V_A$.

Figure 2D:
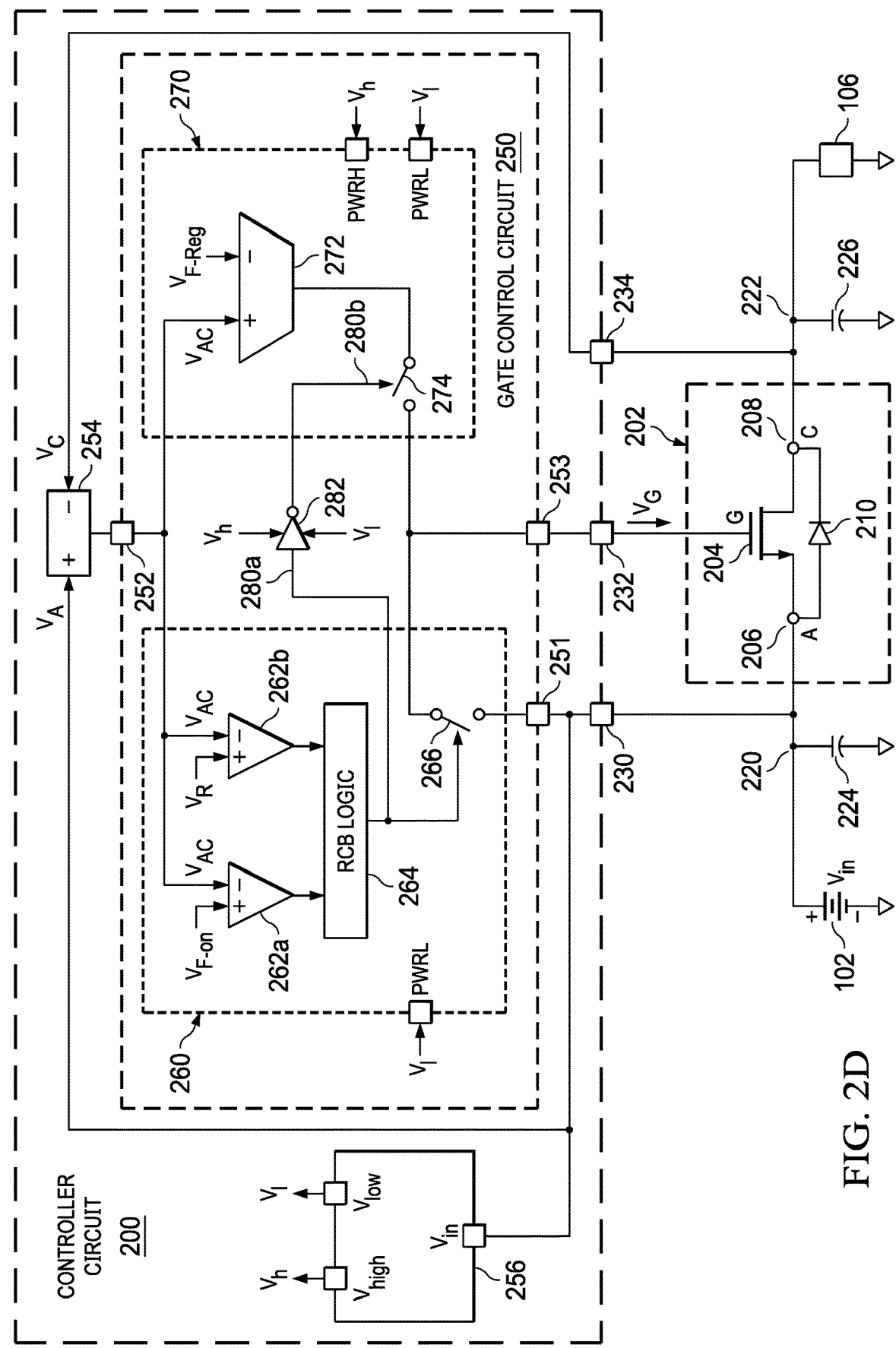

FIG. 2D illustrates examples of internal components of gate control circuit 250. Referring to FIG. 2D, gate control circuit 250 can include a reverse current blocking (RCB) circuit 260, which can include a network of comparators including comparators 262a and 262b, an RCB logic circuit 264, and a switch 266. Switch 266 is coupled between input 251 (which can be coupled to first current terminal 206/ anode of transistor 202) and output 253 (which can be coupled to gate 204). Gate control circuit 250 can also include a forward conduction control circuit 270, which can include an amplifier 272, such as an operational transconductance amplifier (OTA), an op-amp, etc., and a switch 274. Switch 274 can be coupled between the output of amplifier 272 and output 253. In some examples, switch 274 can be part of a switchable output stage of amplifier 272. RCB logic 264 can control switches 266 and 274 via a pair of complimentary control signals 280a and 280b. Accordingly, when switch 266 is closed, switch 274 can be opened, and vice versa. Gate control circuit 250 can include an inverter 282 to generate control signal 280b from control signal 280a.

RCB circuit 260 and forward conduction control circuit 270, through switches 266 and 274, can set the gate-source voltage $V_{GS}$ of transistor 202 in response to the anode-cathode voltage $V_{AC}$, to enable the flow of a forward current from the anode to the cathode (and from battery 102 to load 106), and to block the flow of a reverse current from the cathode back to the anode (and from load 106 back to battery 102), based on techniques described in FIG. 2B.

Figure 2E:
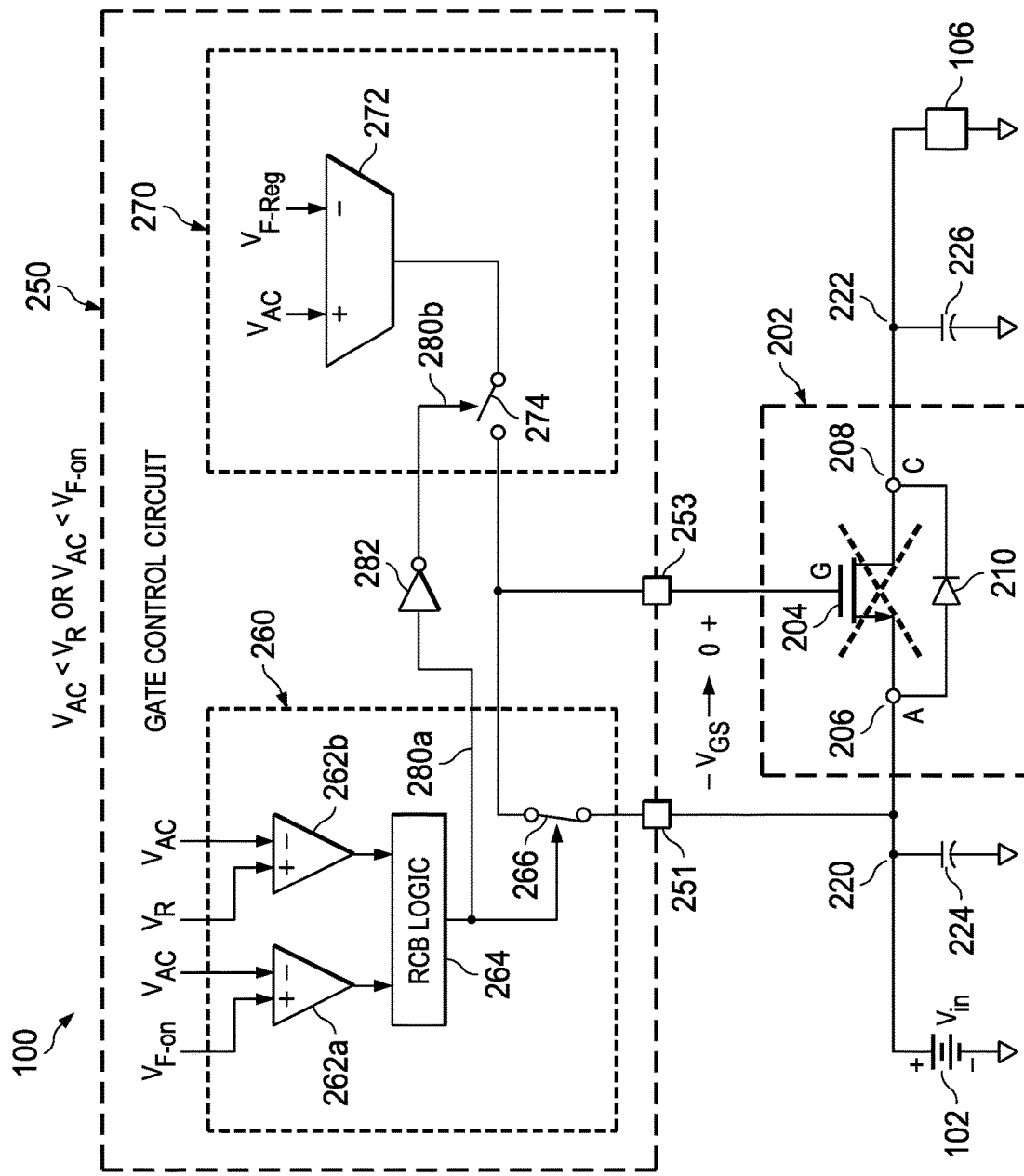

Specifically, referring to FIG. 2E, each of comparators 262a and 262b can receive $V_{AC}$ from voltage subtractor circuit 254. Comparator 262a can compare $V_{AC}$ against forward conduction threshold voltage $V_{F\text{-}on}$ to generate a first decision, and comparator 262b can compare $V_{AC}$ against reverse bias threshold voltage $V_R$ to generate a second decision. If $V_{AC}$ is below $V_{F\text{-}on}$ (which can indicate $V_{AC}$ is raised by a small transient voltage), or if $V_{AC}$ is below $V_R$ (which can indicate a reverse battery connection), RCB logic 264 can provide a control signal 282a to disable transistor 202. Controller circuit 200 can generate control signal 280a to close switch 266 to connect first current terminal 206 with gate 204. By connecting first current terminal 206 with gate 204, the gate voltage $V_G$ can be set to be equal to the source voltage $V_s$, and the gate-source voltage ($V_{GS}$) for transistor 202 can be reduced to zero. With the $V_{GS}$ voltage below a threshold voltage $V_{th}$ for forming a channel below gate 204, transistor 202 can be disabled, and the flow of current between first current terminal 206 and second current terminal 208 of transistor 202 can also be disabled. Moreover, inverter 282 can generate control signal 280b as a complimentary version of control signal 280a to open switch 274, and the output of amplifier 272 can be disconnected from output 253 (and terminal 232) to avoid interfering with the setting of the gate-source voltage ($V_{GS}$) for transistor 202 by RCB circuit 260.

In some examples, RCB logic circuit 264 can include a timing circuit, such as a timer. RCB logic circuit 264 can start the timer after disabling switch 266. The timer can define an RCB timing window in which transistor 202 is to be continuously disabled regardless of whether $V_{AC}$ is below or above the forward conduction threshold voltage $V_{F\text{-}on}$, and switch 266 is to be continuously enabled. Within the RCB timing window, RCB logic circuit 264 can ignore decisions from comparators 262a and 262b to continue closing switch 266 to disable transistor 202, and continue opening switch 274 to disconnect the output of amplifier 272 from gate 204. Such arrangements can reduce the likelihood of controller circuit 200 falsely starting a forward conduction due to transient signals at the anode/cathode. The duration of the RCB timing window can be fixed (e.g., built into RCB logic circuit 264) or can be programmable via a register coupled to RCB logic circuit 264 (not shown in the figures).

Figure 2F:
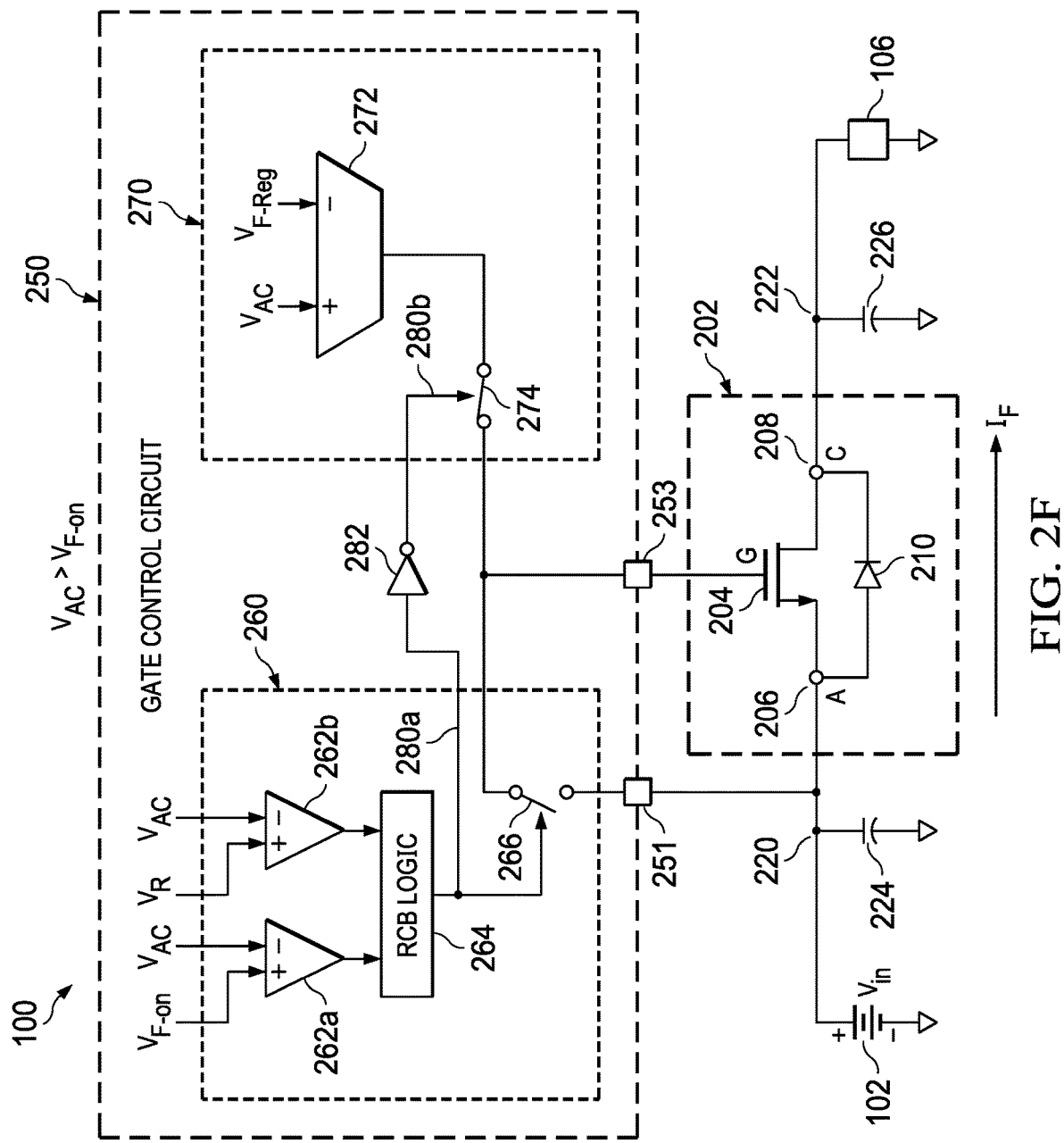

FIG. 2F illustrates examples of operations of gate control circuit 250 to enable forward conduction. Referring to FIG. 2F, if the decisions of comparators 262a and 262b indicate that $V_{AC}$ is higher than $V_{F\text{-}on}$, which can indicate that the battery is connected in the correct polarities (e.g., positive terminal being coupled to the anode of transistor 202), RCB logic 264 can generate control signal 280a to open switch 266, while control signal 280b, being a complimentary version of control signal 280b, can close switch 274 to connect the output of amplifier 272 with output 253 (and gate 204 via terminal 232). Amplifier 272 is then allowed to adjust the gate voltage $V_G$ (or decrease the gate voltage $V_G$ if transistor 202 is PFET) via output 253 and terminal 232. With the anode voltage $V_A$ largely fixed by battery 102, if the gate-source voltage $V_{GS}$ (or $V_{SG}$ if transistor 202 is PFET) becomes higher than the threshold voltage $V_{th}$ of transistor 202, a conduction channel can be created between first current terminal 206 and second current terminal 208 of transistor 202. The conduction channel can then enable the flow of forward current $I_F$ from first current terminal 206 to second current terminal 208 of transistor 202 (and from battery 102 to load 106).

Also, amplifier 272 can implement a feedback loop to set the gate voltage of transistor 202 to regulate the voltage $V_{AC}$ across transistor 202 at a value equal to $V_{F\text{-}reg}$ across different forward currents IF, to emulate a forward-biased diode as shown in FIG. 2A. Amplifier 272 can generate an output (e.g., a current, a voltage, etc.) that is linearly related to a difference between the anode-cathode voltage $V_{AC}$ and a target forward voltage $V_{F\text{-}reg}$ to adjust the on-resistance of the conduction channel of transistor 202. The current provided by amplifier 272 can be converted to a voltage to set the gate voltage of transistor 202, which in turn can set the on-resistance of transistor 202. The on-resistance of transistor 202 can be adjusted, so the voltage $V_{AC}$ across transistor 202 (which can be equal to a product between the on-resistance and the forward current) is maintained at the target forward voltage $V_{F\text{-}reg}$. For example, if load 106 sinks more current, the voltage $V_{AC}$ across transistor 202 can become larger than $V_F$. In response, amplifier 272 can increase the gate-source voltage $V_{GS}$ of transistor 202 (or the source-gate voltage $V_{SG}$ if transistor 202 is PFET) to reduce the on-resistance of transistor 202, to reduce the voltage $V_{AC}$ back to $V_{F\text{-}reg}$. However, if load 106 sinks less current, the voltage $V_{AC}$ can decrease. In response, amplifier 272 can reduce the gate-source voltage $V_{GS}$ of transistor 202 (or $V_{SG}$ if transistor 202 is PFET) to increase its on-resistance, to increase the voltage $V_{AC}$ back to $V_{F\text{-}reg}$.

With such arrangements, a voltage $V_{AC}$ across transistor 202 can be maintained to emulate a forward-biased diode. The voltage provided by transistor 202 to load 106 can be maintained constant (or within a narrow range) and can be independent of forward current $I_F$. This also allows the internal power supply (e.g., internal power supply 108) of load 106 to provide a stable supply voltage. Moreover, $V_{AC}$ can be maintained at a low value to reduce power loss incurred by transistor 202, especially when transistor 202 conducts a huge forward current $I_F$ to load 106.

Referring again to FIG. 2D, RCB circuit 260 can receive low supply voltage Vi from local voltage generator circuit 256, and forward conduction circuit 270 and inverter 282 can receive both low supply voltage $V_l$ and high supply voltage $V_h$ from local voltage generator circuit 256. Specifically, RCB circuit 260 can operate within a voltage range below the anode voltage $V_A$ to either disable transistor 202 by shorting the gate and source of transistor 202, or releasing the gate of transistor 202, therefore RCB circuit 260 can operate on low supply voltage Vi to reduce voltage stress and to improve reliability of the internal devices of RCB circuit 260. Moreover, forward conduction control circuit 270 and inverter 282 can operate within a voltage range above the anode voltage $V_A$. Such arrangements can increase gate overdrive voltage to enable transistor 202 while limiting the gate-drain voltage ($V_{GD}$) and gate-source voltage ($V_{GS}$) to reduce voltage stress across transistor 202, which can improve the reliability of transistor 202. Also, by operating forward conduction control circuit 270 and inverter 282 between the high supply voltage and the low supply voltage, the voltage swing in the devices of forward control circuit 270 and inverter 282 can be reduced, which can also reduce voltage stress and improve reliability of the internal devices of forward control circuit 270 and inverter 282.

Referring back to FIG. 1, while battery 102 outputs a DC voltage signal, reverse battery protection system 112 may receive AC voltage signals that are superimposed on the DC voltage output by battery 102. The AC voltage signals can originate from various sources, such as electromagnetic interference, electrical noises, etc., from other electrical systems. For example, in a case where the system 100 is part of a vehicle, various electrical components, such as motors, switching power converters, etc., can generate periodic AC voltage signals that can be coupled into the wires that couple between battery 102 and electric power system 104. The AC voltage signals can appear as part of the output voltage of battery 102 and can be superimposed with the DC voltage signal. The AC voltage signals can have a positive half-cycle and a negative half-cycle. In the positive half-cycle, the AC voltage signals add to the DC voltage signal to provide an increased anode voltage. In a negative half-cycle, in which the AC signals have negative voltages that subtract from the DC voltage signal to provide a reduced anode voltage. Body diode 210 of transistor 202 can switch between a forward-biased condition during the positive half-cycle and a reverse-biased condition periodically during the negative half-cycle. To protect load 106, controller circuit can control the transistor to operate as a rectifier where the transistor is enabled under the forward-biased condition and is disabled under the reverse-biased condition.

FIG. 3A illustrates an example of a DC voltage signal of battery 102 superimposed with AC voltage signals, and the rectification operation of reverse battery protection system 112. Referring to the left side of FIG. 3A, graph 302 is an example graph of the anode voltage $V_A$ with respect to time. The output voltage of battery 102 provides a DC input voltage (labelled "$V_{in\_DC}$" in FIG. 3A) to reverse battery protection system 112. As shown in graph 302, the anode voltage $V_A$ can include the DC component ($V_{in\_DC}$) as well as an AC component having an amplitude labelled "$V_{in\_AC}$" superimposed with the DC component. The AC component can be attributed to the AC voltage signals. The AC component can be periodic and can have a positive half-cycle in which the AC component has a positive voltage that adds to the DC voltage and a negative half-cycle in which the AC component has a negative voltage that subtracts from the DC voltage. For example, the durations between times $T_0$ and $T_1$ and between times $T_2$ and $T_3$ can represent positive half-cycles, in which the AC component can add to the DC component, and output voltage of battery 102 (and anode voltage $V_A$) exceeds the DC component $V_{in\_DC}$ and has a maximum voltage of $V_{in\_DC}+V_{in\_AC}$. Moreover, the duration between times $T_1$ and $T_2$ can represent a negative half-cycle, in which the AC components can be subtracted from the DC component, and output voltage of battery 102 (and anode voltage $V_A$) falls below the DC component $V_{in\_DC}$ and has a minimum voltage of $V_{in\_DC}-V_{in\_AC}$.

Transistor 202 can switch between a forward-biased condition and a reverse-biased condition periodically between each half cycle of the AC signals superimposed with the DC voltage of battery 102. During the positive half-cycles, the anode voltage (e.g., between $V_{in\_DC}$ and $V_{in\_DC}+V_{in\_AC}$) can be higher than the cathode voltage (e.g., $V_{in\_DC}$) and put transistor 202 in the forward-biased condition, and capacitor 226 can be charged up to $V_{in\_DC}$. During the negative half-cycles, the anode voltage (e.g., between $V_{in\_DC}-V_{in\_AC}$ and $V_{in\_DC}$) can be lower than the cathode voltage (e.g., $V_{in\_DC}$) and put transistor 202 in the reverse-biased condition. As part of the rectification operation to prevent a reverse current from flowing back from load 106 to battery 102 during the negative half-cycles, controller circuit 200 can enable transistor 202 during the positive half-cycles and disable transistor 202 during the negative half-cycles.

Graph 304 of FIG. 3A shows an example graph of the cathode voltage $V_C$ with respect to time as a result of a rectification operation performed by controller circuit 200 with transistor 202. Specifically, during a positive half-cycle, such as between times $T_0$ and $T_1$, the anode-cathode voltage $V_{AC}$ can exceed the forward conduction threshold voltage $V_{F-on}$, and controller circuit 200 can enable transistor 202 to form a conduction channel between first current terminal 206 and second current terminal 208 to connect battery 102 to load 106. Accordingly, the cathode voltage $V_C$ across load 106 can track the anode voltage $V_A$. The voltage $V_{AC}$ can also be maintained at the target forward voltage $V_{F-reg}$ by amplifier 272. Accordingly, the cathode voltage $V_C$ can have a DC component of $V_{out\_DC}$ which equals $V_{in\_DC}-V_{F-reg}$, as well as an AC component having the same (or similar) amplitude $V_{in\_AC}$ as the AC signals at the anode. Within the positive half-cycle, the cathode voltage $V_C$ can first increase from $V_{out\_DC}$, reaching a peak of $V_{out\_DC}+V_{in\_AC}$, and then decrease back to $V_{out\_DC}$.

Moreover, during a negative half-cycle (e.g., between times $T_1$ and $T_2$), the anode voltage $V_A$ is reduced by the AC component, while the cathode voltage $V_C$ can be held at $V_{out\_DC}$ by holdup capacitor 226, and the anode-cathode voltage $V_{AC}$ can be below the reverse bias threshold voltage $V_R$. This can cause controller circuit 200 to disable transistor 202 by removing/disabling the conduction channel between first current terminal 206 and second current terminal. Accordingly, the cathode voltage $V_C$ can stop tracking the anode voltage $V_A$ during the negative half-cycle. The negative half-cycle is followed by a subsequent positive half-cycle (e.g., between times $T_2$ and $T_3$), in which controller circuit 200 can enable transistor 202 again to allow a forward conduction from battery 102 to load 106, and the cathode voltage $V_C$ can track the anode voltage $V_A$ again.

Figure 3B:
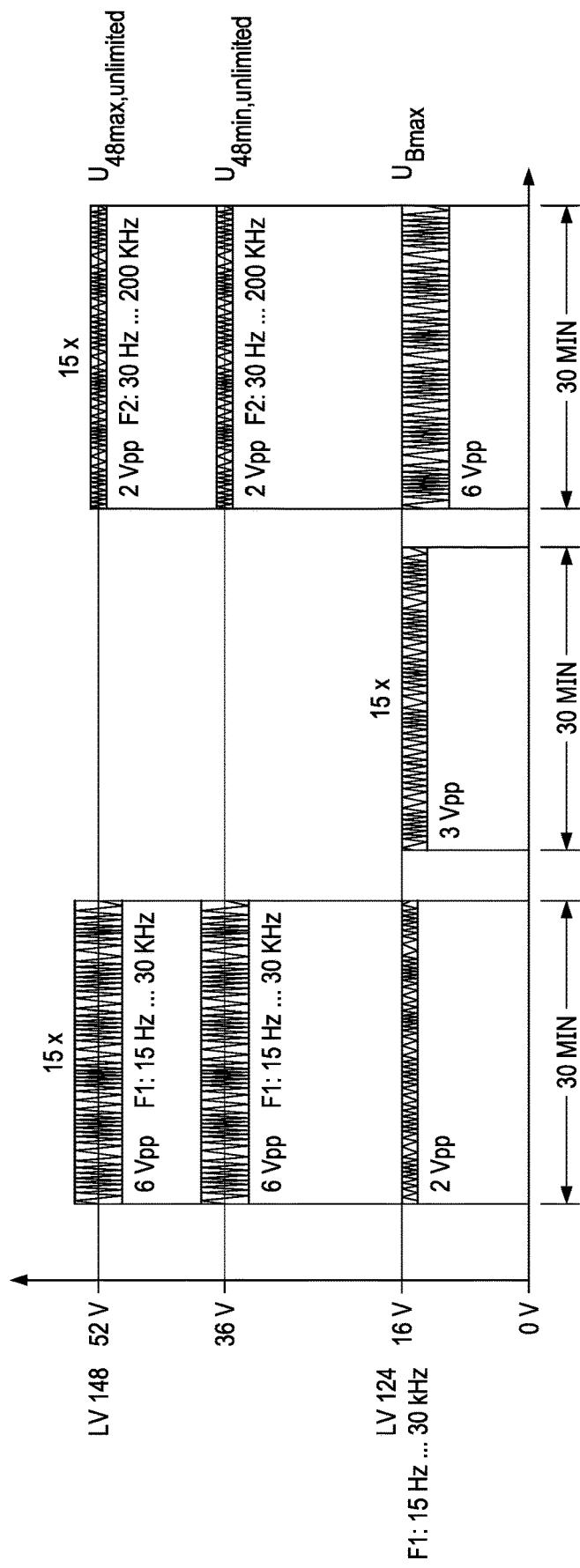

The AC voltage signals that superimpose with the DC voltage signal output by battery 102 can have a high frequency, which can lead to high frequency changes in the input voltage to protection system 112. FIG. 3B illustrates examples of AC voltage signals that may be received by protection system 112 in a vehicle application. For example, according to LV 124 and LV 148, which define testing of electronic components for vehicles, the electric systems of a vehicle can have AC voltage signals of 2-6 peak-to-peak voltage (Vpp) at a frequency of 15 Hz to 200 kHz superimposed on the DC voltage signal output by a battery. Assuming the AC voltage signals have a frequency of 200 kHz and a cycle time of 5 micro-seconds (us), to perform rectification, controller circuit 200 may need to be able to repeatedly enable transistor 202 within a positive half-cycle of 2.5 us and disable transistor 202 within a negative half-cycle of 2.5 us. Accordingly, it is desirable that the controller circuit 200 can have a short rectification response time, in order to enable and disable the transistor promptly in response to high-frequency AC voltage signals present at the battery output.

But controller circuit 200 may have a long rectification response time, especially in enabling transistor 202 to start forward conduction, which makes it challenging to handle AC ripples up at a frequency of 200 kHz and beyond. Specifically, as described above, to emulate a forward-biased diode having a constant forward voltage, controller circuit 200 (and forward conduction control circuit 270) may include amplifier 272, which can be linear amplifier such as an OTA, to implement a feedback loop to regulate the anode-cathode voltage $V_{AC}$ across the transistor at the target forward voltage $V_{F-reg}$. The output of the amplifier can be linearly related to $V_{AC}$. But the amplifier may have a low gain (e.g., a low transconductance (gm) for OTA) to improve loop stability, especially for low forward current/load current. The low gain can reduce the speed by which the amplifier can raise the gate voltage of the transistor, which in turn increases the time it takes for controller circuit 200 to enable transistor 202 (by forming a conduction channel between first current terminal 206 and second current terminal 208) in the positive half-cycle of an AC ripple.

Figure 3C:
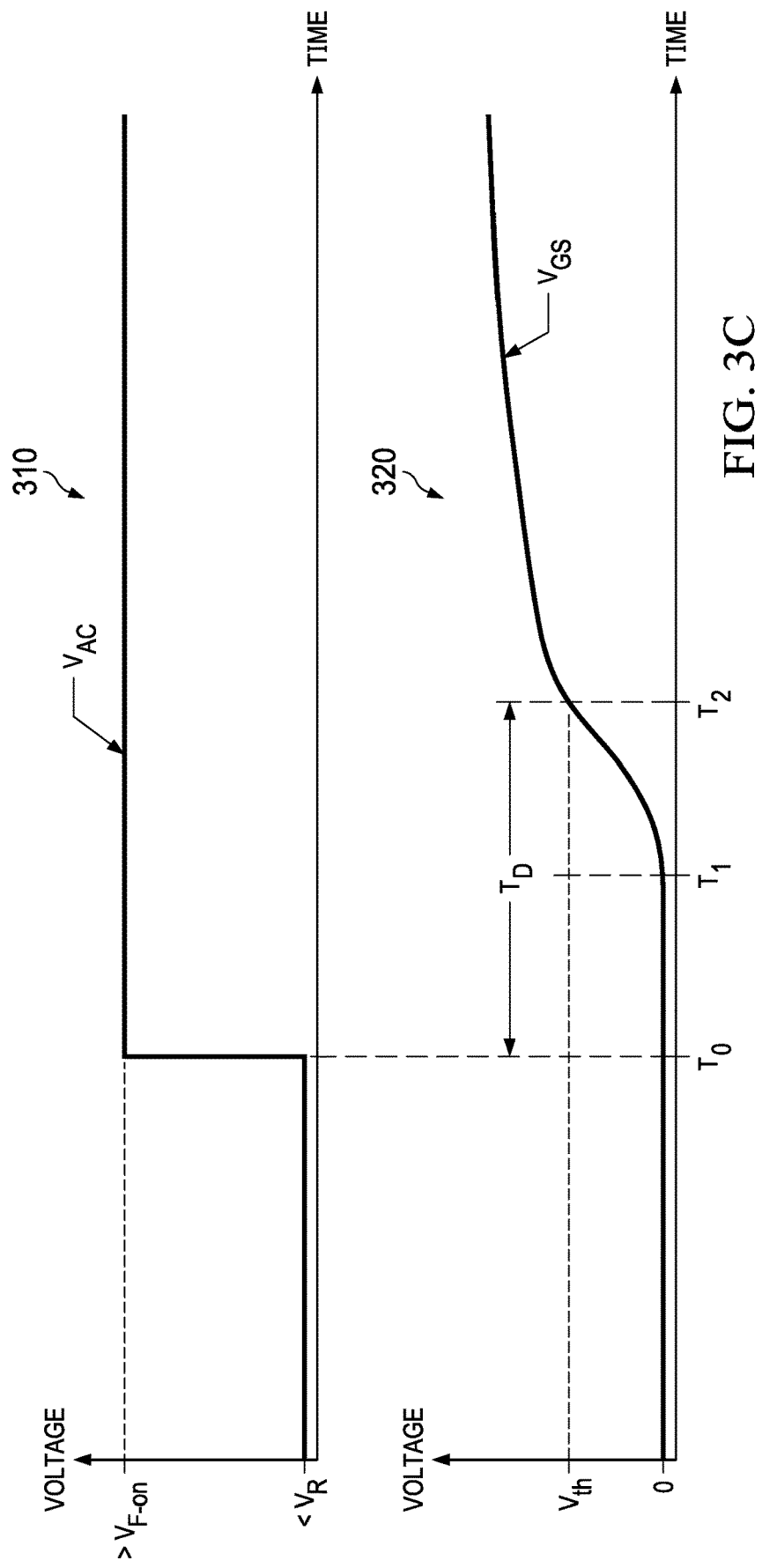

FIG. 3C illustrates a graph 310 and a graph 320. Graph 310 provides an example of variations of $V_{AC}$ with respect to time, and graph 320 provides an example of variations of gate-source voltage $V_{GS}$ of transistor 202 with respect to time, where transistor 202 is under the control of controller circuit 200. Referring to graph 310, $V_{AC}$ can increase from a first voltage below $V_R$ to a second voltage above $V_{F\text{-}on}$ at time $T_0$. In response to detecting that $V_{AC}$ increases from below $V_R$ to above $V_{F\text{-}on}$, gate control circuit 250 to switch from disabling transistor 202 to enabling transistor 202 by changing the gate voltage.

Referring to graph 320, the gate-source voltage $V_{GS}$ is initially at 0V and transistor 202 is disabled prior to time $T_0$. In response to detecting the transition of $V_{AC}$ at time $T_0$, gate control circuit 250 may maintain $V_{GS}$ at 0V, and transistor 202 can remain in the disabled state, until time $T_1$. At time $T_1$, gate control circuit 250 can start increasing $V_{GS}$. At time $T_2$, $V_{GS}$ reaches the threshold voltage $V_{th}$ of transistor 202. In response to $V_{GS}$ reaching $V_{th}$, transistor 202 can form a conduction channel between first current terminal 206 and second terminal 208, and transistor 202 is enabled. Accordingly, a total delay $T_D$ has elapsed from the time $T_0$ when the anode-cathode voltage $V_{AC}$ transitions from lower than $V_R$ to higher than $V_{F\text{-}on}$ to the time $T_2$ when transistor 202 is enabled.

The delay $T_D$ can be attributed to various sources. For example, a first part of the delay $T_D$, between time $T_0$ and $T_1$, can be attributed to the delay incurred by RCB 260 in detecting the changes in $V_{AC}$ and opening switch 266 (and closing switch 274) to allow amplifier 272 to start increasing gate voltage $V_G$. Moreover, a second part of the delay $T_D$, between times $T_1$ and $T_2$, can be incurred by amplifier 272 in raising the gate voltage $V_G$ as part of the feedback loop to regulate $V_{AC}$ at $V_{F\text{-}reg}$. The rate at which amplifier 272 increases $V_G$ can be based on, for example, the gain (e.g., transconductance) of amplifier 272, the capacitance of gate 204, etc.

The total delay $T_D$ between time $T_0$ and time $T_2$ can represent a rectification response time of protection system 112. Depending on various factors, such as comparator delay, the transconductance of amplifier 272, the capacitance of gate 204, etc., the rectification response time $T_D$ can be near 2 us. In a case where the AC ripples have a frequency of 200 kHz and beyond, the half-cycle period will be less than 2.5 us. With a rectification response time that spans most of the positive half-cycle period, transistor 202 can remain disabled for most of the positive half-cycle period, which can prevent load 106 from receiving electric power from battery 102 during most of the positive half-cycle period. Accordingly, protection system 112 may be unable to perform the rectification operation in response to high-frequency AC signals present at the output of battery 102.

Figure 4A:
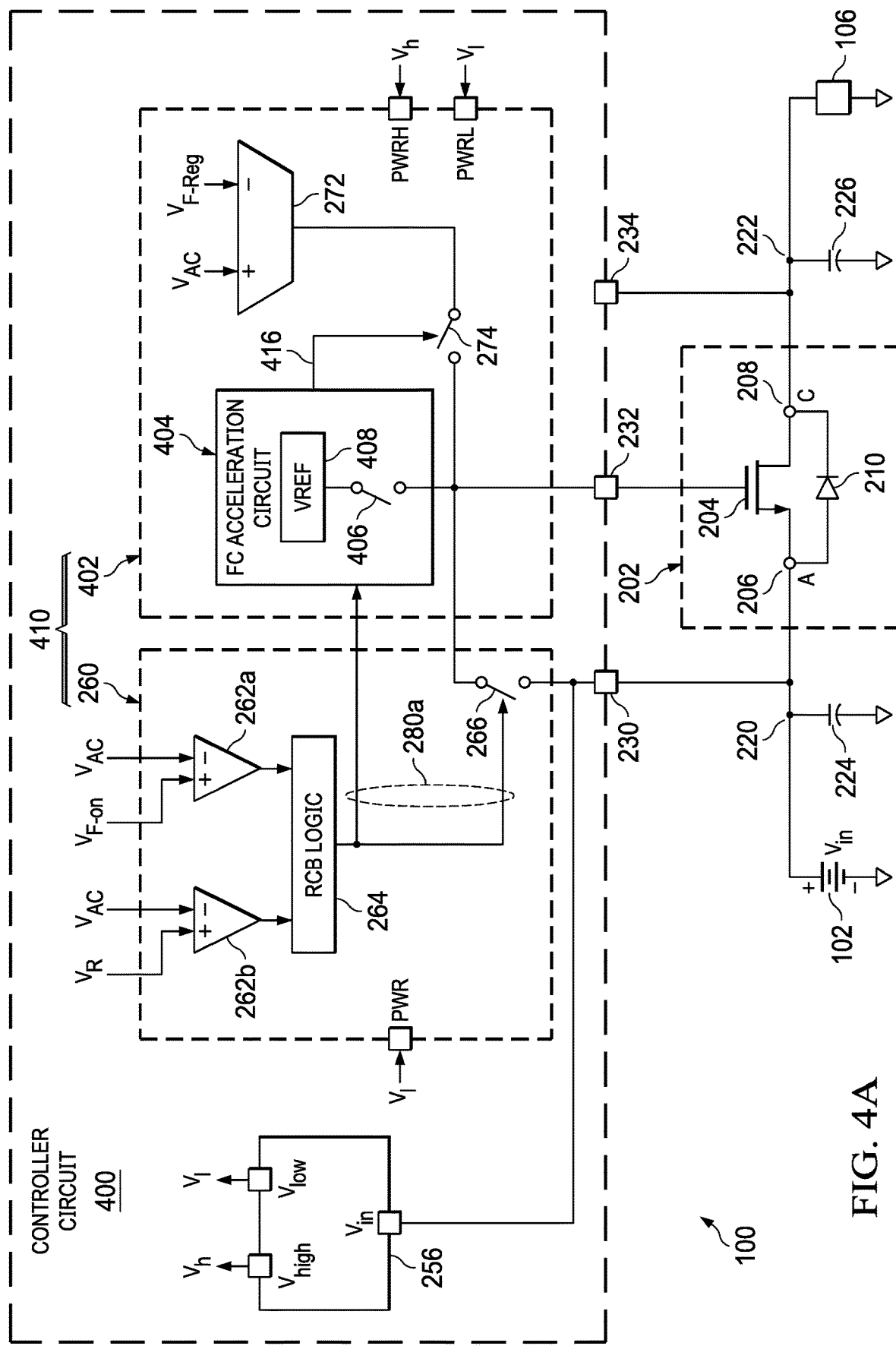
FIGS. 4A through 4F illustrate examples of a protection system including internal components to perform a rectification operation in accordance with various examples.

FIG. 4A through FIG. 4F illustrate examples of a controller circuit 400 that can address at least some of the issues. As shown in FIG. 4A, controller circuit 400 can be part of system 100 of FIG. 1 and can include RCB circuit 260 of FIGS. 2A through 2F. In addition, controller circuit 400 can include a forward conduction (FC) control circuit 402, which can include an FC acceleration circuit 404, as well as amplifier 272 and switch 274 as described in FIGS. 2A through 2F. RCB circuit 260 and FC control circuit 402 can be part of a gate control circuit 410, and each of RCB circuit 260 and FC control circuit 402 is coupled with terminal 232 to set the gate voltage of transistor 202.

FC control circuit 402 can set a gate voltage to form a conduction channel between first terminal 206 and second current terminal 208, to connect battery 102 to load 106. FC acceleration circuit 404 can first set the gate voltage to form the conduction channel, followed by amplifier 272 adjusting the gate voltage to regulate the $V_{AC}$ voltage. Specifically, FC acceleration circuit 404 can include a switch 406 coupled between terminal 232 (and gate 204 of transistor 202) and a voltage reference 408 (labelled "VREF" in FIG. 4A). Switch 406 can be an NFET, a PFET, or a parallel combination of both. FC acceleration circuit 404 can receive an indication of a forward-biased condition. The indication can be based on control signal 280a. For example, based on detecting a transition of control signal 280a to a state to open switch 266, FC acceleration circuit 404 can determine that the forward-biased condition is present (with $V_{AC}$ above $V_{F\text{-}on}$), and close switch 406. The closing of switch 406 can connect voltage reference 408 with gate 204 of transistor 202 via terminal 232, which can raise the gate voltage (or reduce the gate voltage if transistor 202 is PFET) to enable transistor 202. Voltage reference 408 can provide a target voltage to enable transistor 202. After transistor 202 is enabled, if protection system 112 is still within the positive half-cycle, forward conduction circuit 402 can open switch 406, and provide a control signal 416 to close switch 274, which connects the output of amplifier 272 to terminal 232 and allows amplifier 272 to start a regulation loop to further adjust the gate voltage.

Components of FC control circuit 402, including amplifier 472 and FC acceleration circuit 404, can operate on a high supply voltage $V_h$ and a low supply voltage $V_l$ generated by local voltage generator circuit 256 from anode voltage $V_A$. For example, voltage reference 408 can be provided by the high supply voltage $V_h$ if transistor 202 is an NFET. Voltage reference 408 can also be provided by low supply voltage $V_l$ if transistor 202 is a PFET. The high supply voltage $V_h$ and low supply voltage $v_l$ can be configured based on, for example, a margin above (or below) a threshold voltage $V_{th}$ of transistor 202 for forming the conduction channel to enable the transistor. In some examples, the high supply voltage $V_h$ and low supply voltage vi can also be configured based on a voltage stress threshold for the $V_{GS}/V_{SG}$ voltage, to improve reliability of transistor 202. Further, switch 406 can be controlled by a control signal that swings between $V_h$ and $V_l$ to reduce the on-resistance as well as the voltage stress on switch 406, which can improve both the bandwidth and reliability of switch 406.

With the arrangements of FIG. 4A, forward conduction control circuit 402 need not rely on amplifier 272 to both start the enabling of transistor 202 and regulate the $V_{AC}$ of transistor 202, and the reduced gain/transconductance of amplifier 272 (e.g., due to the constraint of loop stability) can have less impact on the delay in enabling transistor 202. Moreover, the speed of enabling transistor 202 can be further improved by increasing the bandwidth (e.g., by reducing the on-resistance) of switch 406. All these can reduce the rectification response time of controller circuit 400 and improve the handling of high-frequency AC signals at the output of battery 102.

Figure 4B:
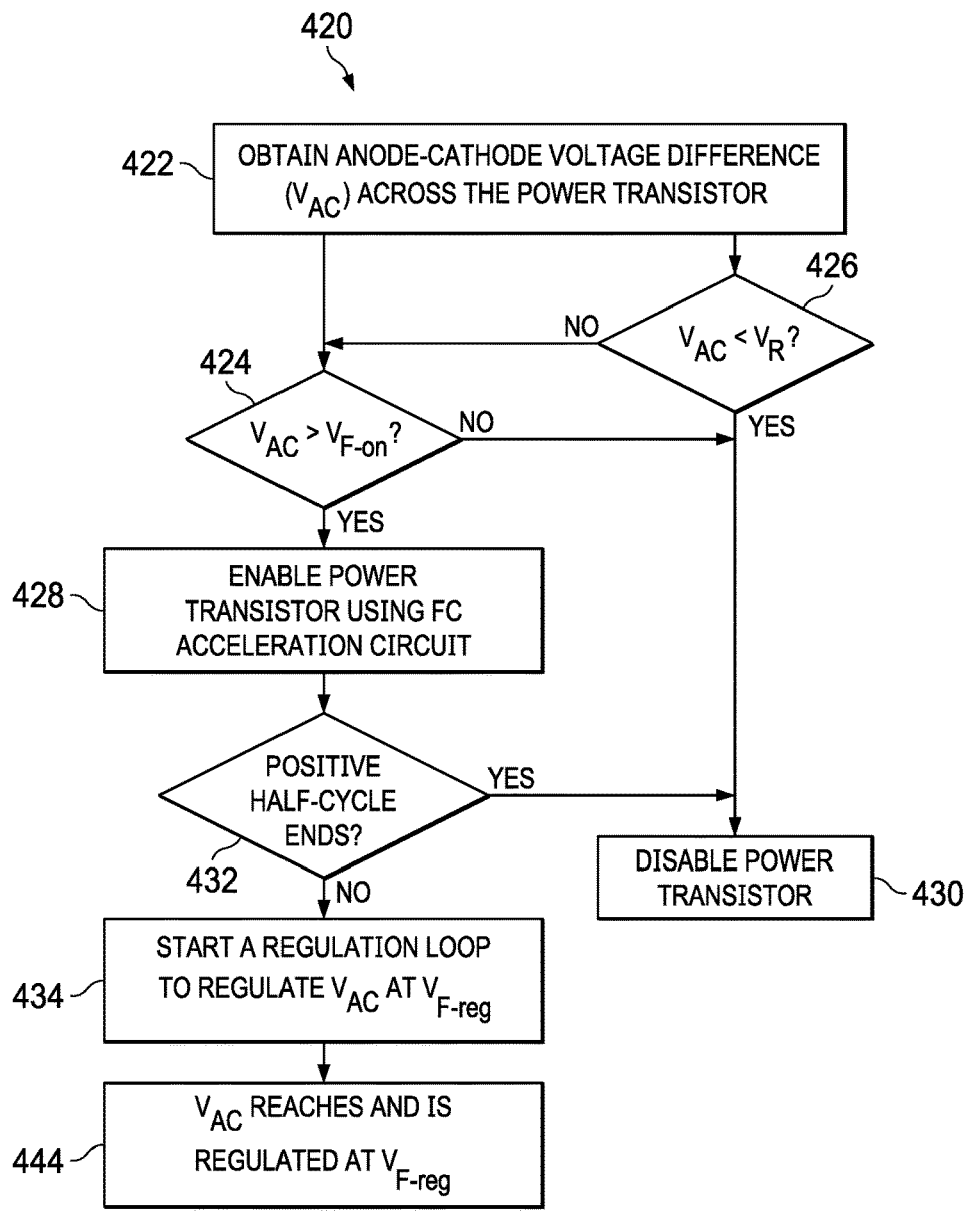

FIG. 4B illustrates a flowchart of an example method 420 performed by controller circuit 400 in controlling transistor 202. Method 400 can be performed after controller circuit 400 starts up and has not yet enabled transistor 202, and with battery 102 supplying a DC voltage to transistor 202. AC ripples may be coupled into and superimposed with the DC voltage, and appear as an AC component of the anode voltage $V_A$ of transistor 202.

In step 422, controller circuit 400 can determine an anode-cathode voltage ($V_{AC}$) across transistor 202. Controller circuit 400 can monitor the anode voltage ($V_A$) at terminal 230 and the cathode voltage ($V_C$) at terminal 234.

Controller circuit 400 can include a subtraction circuit (e.g., implemented using a differential amplifier) to subtract $V_C$ from $V_A$ to provide $V_{AC}$.

Controller circuit 200 can compare $V_{AC}$ with forward conduction threshold voltage $V_{F-on}$ using comparator 262a, in step 424. In addition, controller circuit 200 can also compare $V_{AC}$ with reverse conduction threshold voltage $V_R$, in step 426. $V_{AC}$ can exceed $V_{F-on}$ (and $V_R$) during a positive half-cycle of the AC signals/ripples, and can be below $V_{F-on}$ or $V_R$ during a negative half-cycle of the AC signals/ripples, or when the battery is reverse connected.

In step 428, if $V_{AC}$ exceeds $V_{F-on}$, RCB blocking logic 264 can output control signal 280a to open switch 266 to disconnect RCB circuit 260 from the gate of transistor 202. The opening of switch 266 can also enable FC control circuit 402 to set the gate voltage of transistor 202. Moreover, based on control signal 280a is in a state to open switch 266, FC acceleration circuit 404 can close switch 406 to raise the gate voltage of transistor 202 (or reduce the gate voltage if transistor 202 is PFET). As to be described below, FC acceleration circuit 404 can close switch 406 for a pre-determined duration, or until the gate-source voltage exceeds the threshold voltage $V_{th}$ of transistor 202 (or falls below $V_{th}$ for PFET). Moreover, if $V_{AC}$ is below $V_{F-on}$ or $V_R$ (in steps 424 and 426), RCB logic 264 can close switch 266 to bring the gate-source voltage $V_{GS}$ of transistor 202 to zero to disable the transistor, and switch 406 can be open, in step 430.

Referring back to step 428, after transistor 202 is enabled by FC acceleration circuit 404 and a conduction channel is formed between first current terminal 206 and second current terminal 208, controller circuit 400 can determine whether the positive half-cycle ends, in step 432. The determination can be based on comparing a new $V_{AC}$ (obtained after transistor 202 is enabled) against $V_{F-on}$ and $V_R$. If the new $V_{AC}$ is below either $V_{F-on}$ or $V_R$, controller circuit 400 can determine that the positive half-cycle has ended, and can proceed to step 430 to disable transistor 202.

Moreover, if the new $V_{AC}$ is above $V_{F-on}$ in step 432, which can indicate that the positive half-cycle has not yet ended, controller circuit 400 can start a regulation loop to regulate $V_{AC}$ at a target forward voltage $V_{F-reg}$, in step 434. As part of step 434, FC acceleration circuit 404 can transmit control signal 416 to close switch 274, which allows amplifier 272 to set the gate voltage of transistor 202 via terminal 232. Amplifier 272 can also implement a feedback loop in which the output of amplifier 272 is linearly related to a difference between $V_{AC}$ and $V_{F-reg}$, as described above. In step 444, $V_{AC}$ reaches $V_{F-reg}$, and can be regulated at $V_{F-reg}$ by amplifier 272.

Figure 4C:
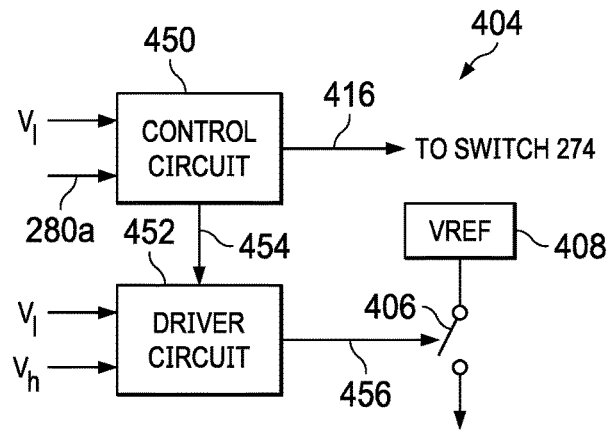

FIGS. 4C through 4F illustrate examples of additional internal components of FC acceleration circuit 404. Referring to FIG. 4C, in addition to switch 406 and voltage reference 408, FC acceleration circuit 404 can include a control circuit 450 and a driver circuit 452. Control circuit 450 can receive control signal 280a. In response to receiving control signal 280a, control circuit 450 can provide control signal 416 to switch 274, and a control signal 454 to switch 406. Control circuit 450 can operate with the low supply voltage Vi. Driver circuit 452 can receive control signal 454 and convert it to a control signal 456 that swings between a pre-determined minimum voltage $v_{min}$ and high supply voltage $V_h$, and provide control signal 456 to switch 406.

Figure 4D:
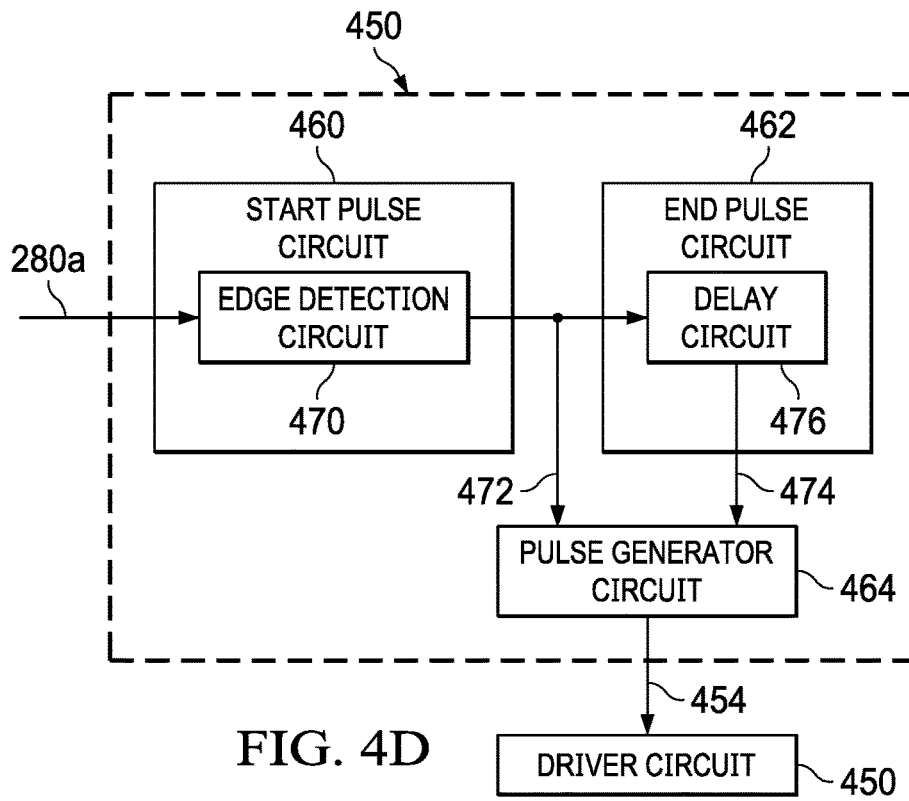
Figure 4E:
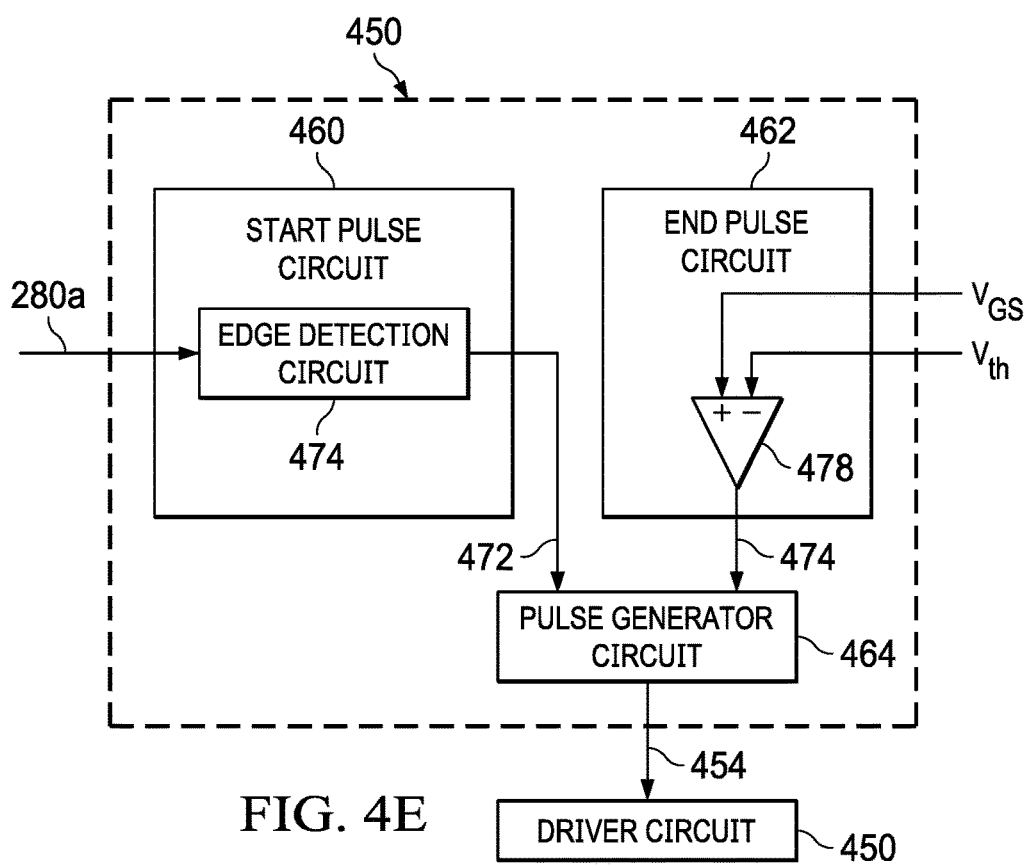

FIG. 4D and FIG. 4E illustrate examples of internal components of control circuit 450. Control circuit 450 can include a start pulse circuit 460, an end pulse circuit 462, and a pulse generator 464. Pulse generator 464 can generate control signal 454, which can be in the form a pulse signal, to close switch 406 for a finite duration, with the start time and end time of the pulse signal being defined by, respectively, start pulse circuit 460 and end pulse circuit 462. Start pulse circuit 460 can include an edge detection circuit 470 to detect a transition in control signal 280a that indicates the start of a forward-biased condition. For example, the transition of control signal 280a can be to a state to open switch 266. Responsive to detecting the transition, start pulse circuit 460 can provide a start signal 472 that reflects the timing of the transition to pulse generator circuit 464. In response to receiving start signal 472, pulse generator circuit 464 can start the pulse of control signal 454.

In addition, end pulse circuit 462 can provide an end signal 474 to pulse generator circuit 464 to end the closing of switch 406. End pulse circuit 462 can generate end signal 474 based on various techniques. Referring to FIG. 4D, end pulse circuit 462 can include a delay circuit 476 to provide end signal 474 as a delayed version of start signal 472, with the delay setting a width of the pulse of control signal 454. Delay circuit 476 can include delay elements (e.g., buffers) to delay pull-up start signal 470. In some examples, delay circuit 476 can include programmable delay elements such that the delay introduced to start signal 472 in generating end signal 474 is programmable. In such examples, delay circuit 476 can be coupled with a programming register to receive a setting for the delay.

The delay of delay circuit 476 (and the pulse width) can be set based on various criteria. For example, the delay can be set based on the minimum half-cycle period of the AC ripples, such that the enabling of the pull-up path can start and end within a positive half-cycle period for the highest-frequency AC ripples to be rectified by controller circuit 400. The delay can also be set based on other factors, such as the gate capacitance of transistor 202, which can vary based on the dimension of the transistor. In some examples, the delay can also be set based on a target on-resistance of transistor 202 for the forward conduction operation. For example, based on the threshold voltage of transistor $V_{th}$, a target gate voltage of transistor 202 can be determined, which can be a certain percentage (e.g., 90%) of the voltage provided by voltage reference 408. Based on the gate capacitance of transistor 202 as well as the on-resistance of switch 406, the time need to bring the gate voltage of transistor 202 to the target voltage can be determined, and the pulse width (and delay of delay circuit 476) can be pre-configured accordingly.

FIG. 4E illustrates another example of pulse end circuit 462. Specifically, pulse end circuit 462 can end the pulse and open switch 406 when the gate-source voltage $V_{GS}$ goes above a threshold, such as threshold $V_{th}$ of transistor 202 for forming a conduction channel between first current terminal 206 and second current terminal 208. Referring to FIG. 4E, pulse end circuit 462 can include a comparator 478 to compare the gate-source voltage $V_{GS}$ (or $V_{SG}$ for PFET) which can be obtained from a subtraction circuit that subtracts the source voltage $V_s$ (obtained via terminal 230) from the gate voltage $V_G$ (obtained via terminal 232). If $V_{GS}$ rises above $V_{th}$, comparator 478 can trip to generate pull-up end signal 472, which can signal the end of the pull-up operation to pulse generator 466.

Figure 4F:
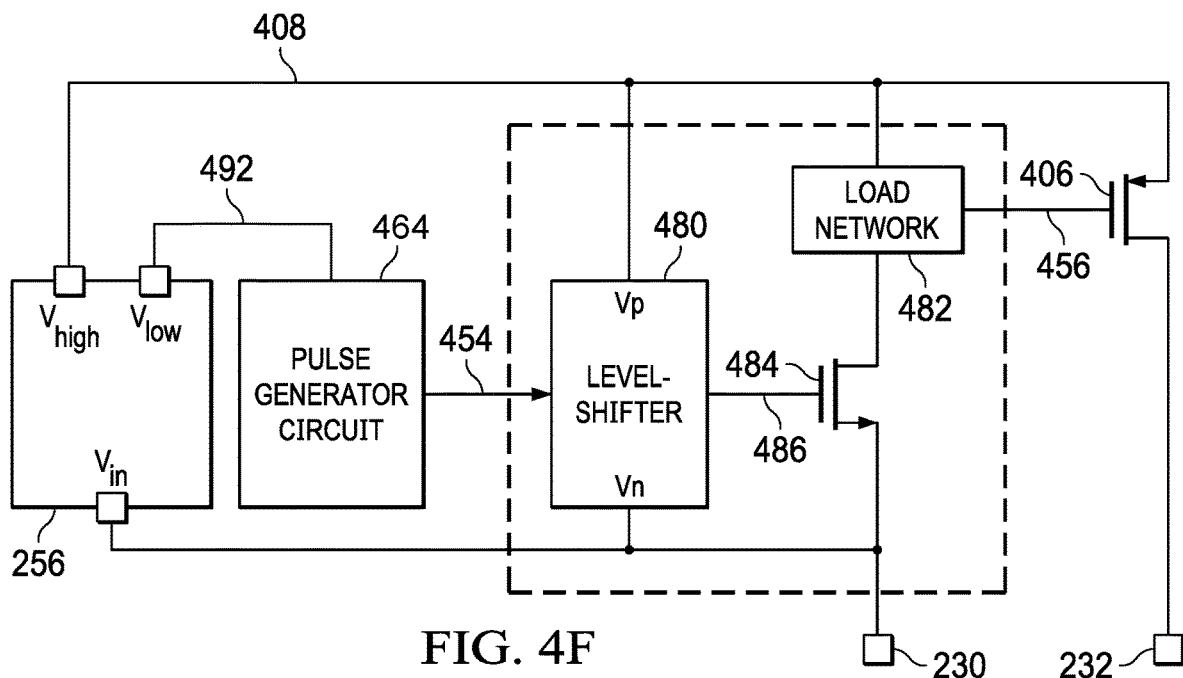

FIG. 4F illustrates examples of internal components of driver circuit 450, as well as switch 406 and voltage reference 408, in a case where transistor 202 is an NFET. Referring to FIG. 4F, switch 406 can be implemented using a PFET, coupled between voltage reference 408 and terminal 232. Voltage reference 408 can be provided as the high supply voltage $V_h$ from $V_{high}$ terminal of local voltage generator circuit 256. In addition, driver circuit 450 includes a level-shifter 480, a load network 482, and an NFET 484 coupled between load network 482 and terminal 230. Level-shifter 480 can have a positive voltage supply terminal (labelled "Vp") coupled with high supply voltage $V_h$ (and voltage reference 408), and a negative voltage supply terminal (labelled "Vn") coupled with terminal 230, which provides access to the anode voltage $V_A$. Level-shifter 480 can receive, from pulse generator circuit 464, control signal 454 that can swing between 0 to $V_l$, and perform a level-shifting of control signal 454 to generate a control signal 486 with a voltage swing between $V_h$ and $V_A$, and drive NFET 484 with control signal 486. Both control signals 452 and 486 can be pulse signals.

In the example of FIG. 4F, control signals 454 and 486 can be active-high pulse signals, with the high pulse defining the duration when switch 406 is closed. When NFET 484 is enabled by control signal 486, NFET 484 can form a voltage divider with load network 482, and the voltage divider can set the minimum voltage $V_{in}$ of control signal 456 to PFET/switch 406. Responsive to control signal 456 being at $V_{min}$, PFET/switch 406 can be enabled/closed to connect gate 204 of transistor 202 to voltage reference 408. When NFET 484 is disabled by control signal 486, load network 482 can pull control signal 456 to the high supply voltage $V_h$, and PFET/switch 406 can be disabled/opened. Load network 482 can include a network of passive elements, such as resistors, Zener diodes, etc., to limit the voltage swing of the gate of pull-up transistor 480 to reduce voltage stress and to improve reliability.

With the arrangements of FIG. 4F, the gate voltage $V_G$ can be set at a value higher than the anode voltage $V_A$ (e.g., high supply voltage $V_h$) to enable transistor 202. As the anode voltage $V_A$ is also the source voltage $V_S$ of transistor 202, the gate-source voltage $V_{GS}$ can exceed the threshold voltage $V_{th}$ to form the conduction channel between first current terminal 206 and second current terminal 208 of transistor 202. Moreover, by using level-shifter 480 to level-shift a pulse signal that swings between low supply voltage $V_l$ and ground to another pulse signal that swings between high supply voltage $V_h$ and the anode voltage $V_A$, the maximum voltages experienced by the transistor devices of pulse generator circuit 464, as well as NFET 484 and PFET/switch 406, can be reduced, which can reduce voltage stress and improve reliability of control circuit 400. Further, as the anode voltage $V_A$ (and source voltage $V_s$) may vary based on the DC voltage output by battery 102, generating the control signals and internal voltages based on the anode voltage $V_A$ can ensure that the control signals and internal voltages have a deterministic relationship with the anode voltage $V_A$ and source voltage $V_S$, which can improve the predictability of control circuit 400.

Figure 5:
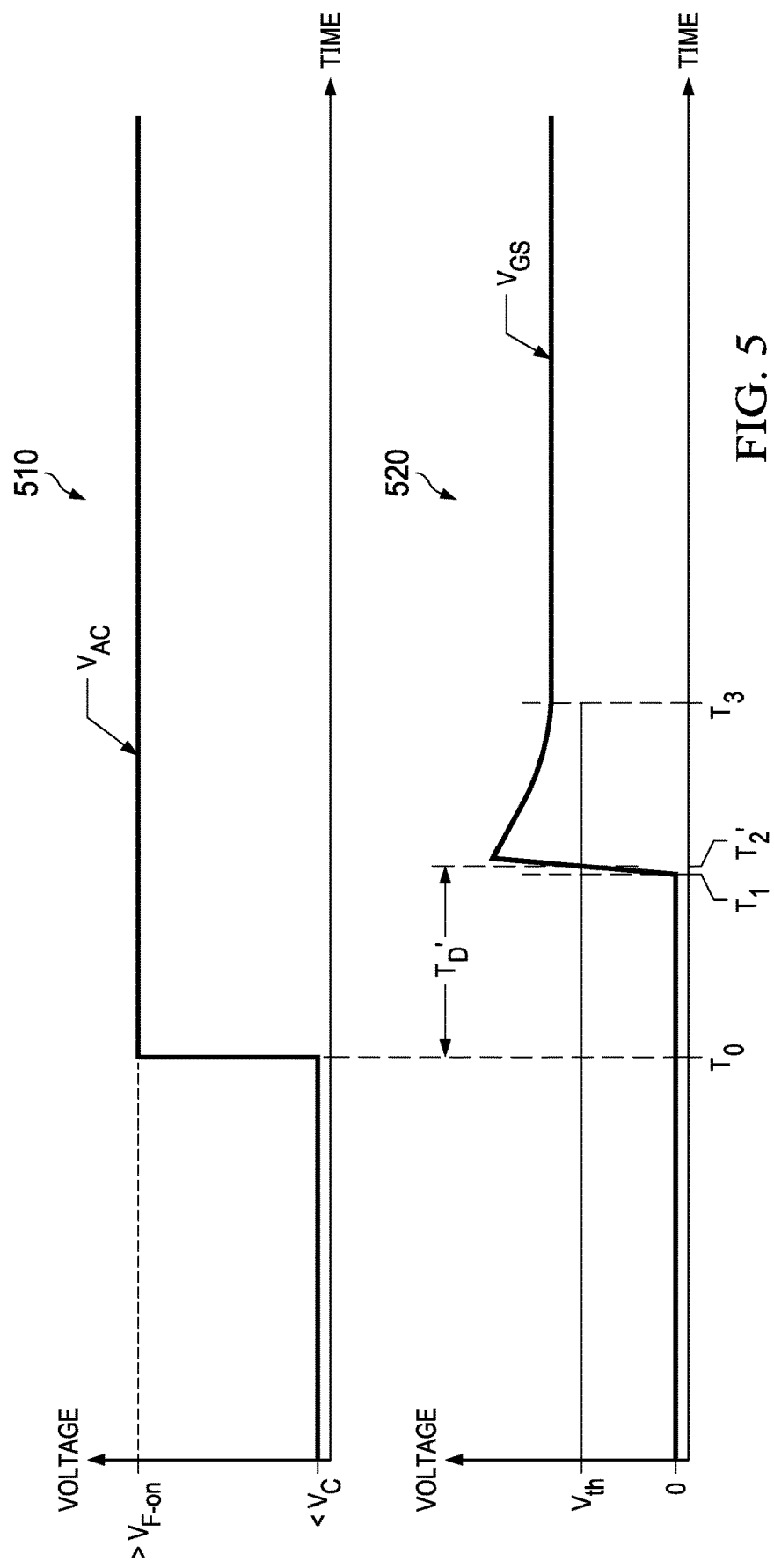
FIG. 5 illustrates examples of voltage graphs depicting a rectification operation by the protection system of FIGS. 4A through 4F.

FIG. 5 illustrates examples of a graph 510 of $V_{AC}$ across transistor 202 with respect to time, and a graph 520 of the gate-source voltage $V_{GS}$ of transistor 202 with respect to time, under the control of controller circuit 400. Referring to graph 510, $V_{AC}$ increases from a first voltage below $V_R$ to a second voltage above $V_{F-on}$ at time $T_0$. Referring to graph 520, the gate-source voltage $V_{GS}$ is initially at 0V and transistor 202 is disabled. It takes until time $T_1$ when RCB circuit 260 generates control signal 280a to disable switch 266.

Between times $T_1$ and $T_2'$, responsive to detecting that control signal 280a is at a state to open switch 266, FC acceleration circuit 404 can close switch 406 to raise (or reduce) the gate voltage of transistor 202. The rate of change of the gate voltage can be impacted more by, for example, the on-resistance of switch 406, the capacitance of gate 204, etc., and less by the gain/transconductance of amplifier 472. Accordingly, in FIG. 5, the $V_{GS}$ voltage can change at a higher rate and can reach the threshold $V_{th}$ at time $T_2'$, which is earlier than time $T_2$ in FIG. 3C. Accordingly, the total delay $T_D'$ between times $T_1$ and $T_2'$ can also be reduced compared with $T_D$ in FIG. 3C. Switch 406 can be opened at time $T_2'$. Between times $T_2'$ and $T_3$, amplifier 272 can operate a regulation loop to set the $V_{GS}$ voltage in order to regulate the anode-cathode voltage $V_{AC}$ at $V_{F-REG}$.

Figure 6:
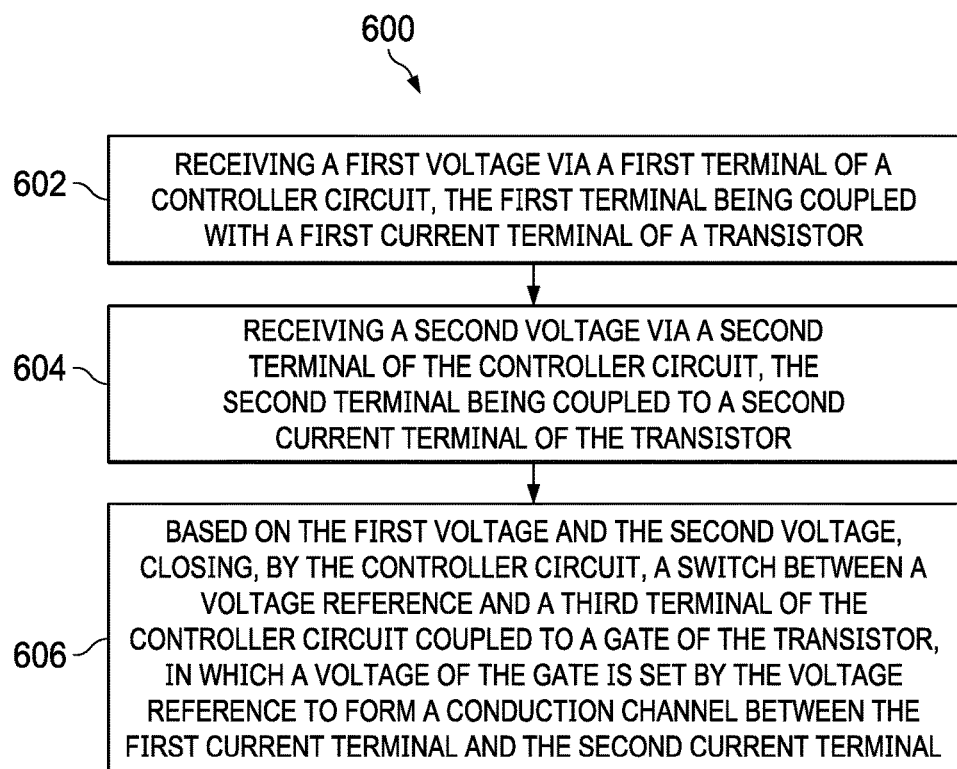
FIG. 6 is a flowchart of an example method for performing a rectification operation in accordance with various examples.

FIG. 6 is a flowchart of an example method 600 for performing a rectification operation by an electric power system coupled between a battery and a load, in a case where the DC voltage signal output by the battery is superimposed with AC signals. Method 600 can be performed by, for example, controller circuit 400 of FIGS. 4A through 4F. Although the method steps are described in conjunction with FIGS. 4A through 4F, any system configured to perform the method steps, in any suitable order, is within the scope of this description.

At step 602, controller circuit 400 can receive, via a first terminal (e.g., terminal 230), a first voltage. The first terminal can be adapted to be coupled to a transistor's first current terminal (e.g., transistor 202's first current terminal 206). The first current terminal can be an anode of a diode. The first current terminal can be a source if the transistor is NFET, and can be a drain if the transistor is PFET. The first current terminal can be adapted to be coupled to a battery (e.g., battery 102). The first voltage can be an anode voltage ($V_A$).

At step 604, controller circuit 400 can receive, via a second terminal (e.g., terminal 234), a second voltage. The second terminal can be adapted to be coupled to the transistor's second current terminal. The second current terminal can be a cathode of the diode. The second current terminal can be a drain if the transistor is NFET, and can be a source if the transistor is PFET. The second current terminal can be adapted to be coupled to a load (e.g., load 106). The second voltage can be cathode voltage ($V_C$).

At step 606, based on the first voltage and the second voltage, controller circuit 400 can close a switch (e.g., switch 406) between a voltage reference (e.g., voltage reference 408) and a third terminal (e.g., terminal 232) of the controller circuit coupled to a gate of the transistor, in which a voltage of the gate is set by the voltage reference to form a conduction channel between the first current terminal and the second current terminal.

Specifically, controller circuit 400 can include switch 406 coupled between terminal 232 (and gate 204 of transistor 202) and voltage reference 408. Voltage reference 408 can provide a target gate voltage to turn on/enable transistor 202. The target gate voltage can be higher than the source voltage of transistor 202 if transistor 202 is NFET. The target gate voltage can also be lower than the source voltage of transistor 202 is transistor 202 is PFET. Voltage reference 408 can be provided by a local voltage generator circuit, such as local voltage generator circuit 256, based on the anode voltage.

If the anode-cathode voltage $V_{AC}$ exceeds reverse bias threshold voltage $V_R$ and forward conduction threshold voltage $V_{F-on}$, RCB logic 264 can generate control signal 280a to open switch 266. Based on control signal 280a, control circuit 400 can close switch 406 to connect the gate of transistor 202 to voltage reference 408 to raise (or reduce) the gate voltage. In some examples, controller circuit 400 can generate a pulse having a pre-determined pulse width to close switch 406, with the start of the pulse triggered by control signal 280a. In some examples, control circuit 400 can end the pulse (and open switch 406) based on the gate-source voltage $V_{GS}$ (or source-gate voltage $V_{SG}$ for PFET) exceeding the threshold voltage $V_{th}$ of transistor 202 for forming the conduction channel between first current terminal 206 and second current terminal 208.

Step 606 can be performed as part of a rectification operation during the positive half-cycle of the AC signals. In some examples, if the positive half-cycle has not yet ended when the pulse ends and switch 406 is opened, controller circuit 400 can close switch 274 to enable amplifier 272 to further adjust the gate voltage to regulate $V_{AC}$ at the target forward voltage $V_{F\text{-}reg}$. If the positive half-cycle has ended and the system is in the negative half-cycle of the AC signals, RCB logic 264 can close switch 266 to set the $V_{GS}$ voltage (or $V_{SG}$ voltage for PFET) to zero to disable transistor 202.

Accordingly, in some examples as described above, a protection system can include a controller circuit and a transistor, which can be a power transistor. Examples of protection system 100 are shown in FIG. 1 through FIG. 4B, whereas examples of controller circuit 400 are shown in FIGS. 4A through 4D. Referring to FIG. 4A, controller circuit 400 can include a first terminal (e.g., terminal 230), a second terminal (e.g., terminal 234), and a third terminal (e.g., terminal 232). The first terminal is adapted to be coupled to a first current terminal of a transistor (e.g., first current terminal 206 of transistor 202). The second terminal is adapted to be coupled to a second current terminal of the transistor (e.g., second current terminal 206 of transistor 202). The third terminal is adapted to be coupled to a gate of the transistor (e.g., gate 204). Controller circuit 400 can control the transistor to emulate an ideal diode, of which the first current terminal is the anode and the second current terminal is the cathode. The anode can be adapted to be coupled to a battery (e.g., battery 102), and the cathode can be adapted to be coupled to a load (e.g., load 106). In a case where the transistor is an NFET, the first current terminal can be a source and the second current terminal can be a drain. In a case where the transistor is a PFET, the first current terminal can be a drain and the second current terminal can be a source.

Referring to FIG. 4A, controller circuit 400 can include gate control circuit 410, which can include reverse current blocking (RCB) circuit 260 and forward conduction (FC) control circuit 402. FC control circuit 402 can include a FC acceleration circuit 404 as well as amplifier 272. Each of RCB circuit 260, FC acceleration circuit 404, and amplifier 272 can be coupled to terminal 232 (and gate 204 of transistor 202) to set a gate voltage. RCB circuit 260 can set the gate-source voltage $V_{GS}$ (or source-gate voltage $V_{SG}$ for PFET) to zero to disable transistor 202 if the anode-cathode voltage $V_{AC}$ is below a reverse bias threshold voltage $V_R$ or a forward conduction threshold voltage $V_{F\text{-}on}$. RCB circuit 260 may include switch 266 coupled between terminals 230 and 232, and may generate control signal 280a to close switch 266 to set $V_{GS}/V_{SG}$ to zero to disable transistor 202, or to open switch 266 to enable FC control circuit 402 to set the gate voltage. In some examples, RCB circuit 260 can disable transistor 202 in the negative half-cycles of the AC signals that superimpose with the DC signal output by the battery, as part of a rectification operation performed by controller circuit 400 with transistor 202.

In addition, FC control circuit 402 can enable transistor 202 by raising (or reducing) the gate voltage to increase $V_{GS}/V_{SG}$ to enable transistor 202, if $V_{AC}$ is above $V_{F\text{-}on}$. FC acceleration circuit 404 can include switch 406 coupled between voltage reference 408 and terminal 232. If $V_{AC}$ is above $V_{F\text{-}on}$, FC acceleration circuit 404 can close switch 406 to connect terminal 232 (and gate 204) to voltage reference 408 to change the gate voltage. The rate at which the gate voltage changes can be based on, for example, the on-resistance of switch 406, the capacitance of gate 204, etc., and can be independent from the gain/transconductance of amplifier 272. FC acceleration circuit 404 can generate a pulse to close switch 406 for a finite duration. The start time of the pulse can be based on detection of $V_{AC}$ being above $V_{F\text{-}on}$ (e.g., based on control signal 280a). The end time of the pulse can be based on a pre-determined delay from the start time, or based on the $V_{GS}$ voltage (or $V_{SG}$ voltage for PFET) exceeding a threshold voltage (e.g., $V_{th}$ of transistor for forming the conduction channel). In some examples, FC control circuit 402 can enable transistor 202 in the positive half-cycles of the AC signals, as part of a rectification operation performed by controller circuit 400 with transistor 202.

Moreover, the output of amplifier 272 can be coupled to terminal 232 via switch 274. After the pulse that closes switch 406 ends, if $V_{AC}$ is still above $V_{F\text{-}on}$ (e.g., the positive half-cycle has not yet ended), FC control circuit 402 can close switch 274 to allow amplifier 272 to further adjust the gate voltage by regulating $V_{AC}$ at the target forward voltage $V_{F\text{-}reg}$.

In this description, the term "couple" may cover connections, communications, or signal paths that enable a functional relationship consistent with this description. For example, if device A generates a signal to control device B to perform an action, then: (a) in a first example, device A is coupled to device B; or (b) in a second example, device A is coupled to device B through intervening component C if intervening component C does not substantially alter the functional relationship between device A and device B, such that device B is controlled by device A via the control signal generated by device A. Also, in this description, a device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof. Furthermore, in this description, a circuit or device that includes certain components may instead be adapted to be coupled to those components to form the described circuitry or device. For example, a structure described as including one or more semiconductor elements (such as transistors), one or more passive elements (such as resistors, capacitors and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, such as by an end-user and/or a third party.

While certain components may be described herein as being of a particular process technology, these components may be exchanged for components of other process technologies. Circuits described herein are reconfigurable to include the replaced components to provide functionality at least partially similar to functionality available before the component replacement. Components illustrated as resistors, unless otherwise stated, are generally representative of any one or more elements coupled in series and/or parallel to provide an amount of impedance represented by the illustrated resistor. For example, a resistor or capacitor illustrated and described herein as a single component may instead be multiple resistors or capacitors, respectively, coupled in series or in parallel between the same two nodes as the single resistor or capacitor. Also, uses of the phrase "ground voltage potential" in this description include a chassis ground, an Earth ground, a floating ground, a virtual ground, a digital ground, a common ground, and/or any other form of ground connection applicable to, or suitable for, the teachings of this description. Unless otherwise stated, "about," "approximately," "nearly," or "substantially" preceding a value means+/−10 percent of the stated value.

Modifications are possible in the described examples, and other examples are possible, within the scope of the claims.

What is claimed is:

1. A controller circuit comprising:
a voltage subtractor circuit having a subtractor output and first and second subtractor inputs, the first subtractor input adapted to be coupled to a first current terminal of a transistor, and the second subtractor input adapted to be coupled to a second current terminal of the transistor;
an internal voltage generator circuit having a generator input and a generator output, the generator input adapted to be coupled to the first current terminal; and
a gate control circuit having a first gate control input, a second gate control input, and a gate control output, the first gate control input coupled to the subtractor output, the second gate control input coupled to the generator output, the gate control output adapted to be coupled to a gate of the transistor, the gate control circuit including a switch coupled between the gate control output and the second gate control input.

2. The controller circuit of claim 1, wherein the gate control circuit is configured to:
receive, via the first gate control input, a difference voltage between a first voltage at the first current terminal and a second voltage at the second current terminal; and
close the switch responsive to the difference voltage exceeding a threshold voltage.

3. The controller circuit of claim 2, wherein the switch is a first switch, the threshold voltage is a first threshold voltage, and the gate control circuit includes:
an amplifier having an amplifier output and first and second amplifier inputs, the first amplifier input coupled to the gate control input, and the amplifier configured to generate a third voltage, in which the third voltage is linearly related a difference between the difference voltage at the first amplifier input and a second threshold voltage at the second amplifier input, and the second threshold voltage is lower than the first threshold voltage; and
a second switch coupled between the amplifier output and the gate control output;
in which the gate control circuit is configured to:
close the first switch for a pre-determined duration; and
after the duration: open the first switch; and close the second switch to provide the third voltage at the gate control output.

4. The controller circuit of claim 3, wherein the amplifier is configured to provide the third voltage to maintain the difference voltage at the second threshold voltage.

5. The controller circuit of claim 3, wherein the amplifier includes at least one of: an operational transconductance amplifier (OTA), or an operational amplifier (Op-amp).

6. The controller circuit of claim 3, wherein the difference voltage is a first difference voltage, and the gate control circuit is configured to, after the duration ends:
receive a second difference voltage via the gate control input; and
responsive to the second difference voltage exceeding the first threshold voltage, close the second switch.

7. The controller circuit of claim 3, wherein the gate control circuit includes:
a third switch adapted to be coupled between the first current terminal and the gate; and
a reverse current block (RCB) circuit having an RCB input and an RCB output, the RCB input coupled to the gate control input, the RCB output coupled to the third switch, and the RCB circuit is configured to provide a control signal at the RCB output based on whether the difference voltage exceeds the first threshold voltage.

8. The controller circuit of claim 7, wherein the control signal is a first control signal, and the gate control circuit includes:
a forward conduction (FC) control circuit having an FC input and first and second FC outputs, the FC input coupled to the RCB output, the second FC output coupled to the second switch, and the FC control circuit configured to:
determine a start time and an end time of the duration based on a timing of the first control signal;
provide, at the first FC output, a second control signal and a third control signal indicating, respectively, the start time and the end time of the duration; and
after the duration ends, provide, at the second FC output, a fourth control signal based on whether the difference voltage exceeds the first threshold voltage; and
a pulse generator having a pulse generator input and a pulse generator output, the pulse generator input coupled to the first FC output, the pulse generator output coupled to the first switch, and the pulse generator configured to:
generate a pulse signal based on the first and second control signals; and
provide the pulse signal at the pulse generator output.

9. The controller circuit of claim 8, wherein the FC control circuit includes an edge detection circuit configured to generate the first control signal responsive to detecting a transition of the first control signal.

10. The controller circuit of claim 8, wherein the FC control circuit includes a delay circuit having a delay circuit input and a delay circuit output, the delay circuit output coupled to the discharge control output, and the delay circuit is configured to:
receive, via the delay circuit input, the second control signal; and
provide, at the first FC output, the third control signal by adding a pre-determined delay corresponding to the duration to the second control signal.

11. The controller circuit of claim 10, wherein the delay circuit includes programmable delay elements.

12. The controller circuit of claim 8, wherein:
the voltage subtractor circuit is a first voltage subtractor circuit;

the subtractor output is a first subtractor output;
the FC control circuit includes:
a second voltage subtractor circuit having a second subtractor output and third and fourth subtractor inputs, the third subtractor input coupled to the first subtractor input, the fourth subtractor input coupled to the gate control output, and the second voltage subtractor circuit configured to provide, at the second subtractor output, a second difference voltage between the first voltage and a fourth voltage at the gate; and
a comparator having a comparator output and first and second comparator inputs, the comparator output coupled to the first FC output, the first comparator input coupled to the second subtractor output, and the comparator configured to provide, at the second comparator output, the second control signal responsive to the second difference voltage at the third comparator input and a third threshold voltage, in which the third threshold voltage is a threshold of the second difference voltage to enable the transistor.

13. The controller circuit of claim 1, wherein:
the first current terminal is adapted to be coupled to a battery to receive a direct current (DC) signal and a multi-cycle alternating current (AC) signal superimposed with the DC signal, in which the AC signal subtracts from the DC signal to provide a first voltage at the first current terminal in in negative half-cycles of the AC signal, and the AC signal adds to the DC signal to provide a second voltage at the first current terminal in positive half-cycles of the AC signal;
the second current terminal is adapted to be coupled to a load; and
the gate control circuit is configured to:
disable the transistor in the negative half-cycles; and
enable the transistor in the positive half-cycles by closing the switch.

14. The controller circuit of claim 1, wherein:
the transistor is an N-type transistor;
the first current terminal is a source of the transistor; and
the second current terminal is a drain of the transistor.

15. A controller circuit comprising:
a voltage subtractor circuit having a subtractor output and first and second subtractor inputs, in which the first subtractor input is adapted to be coupled to a transistor's first current terminal as an anode of a diode, and the second subtractor input is adapted to be coupled to the transistor's second current terminal as a cathode of the diode; and
a gate control circuit having a gate control input and a gate control output, the gate control input coupled to the subtractor output, the gate control output adapted to be coupled to a gate of the transistor, the gate control circuit including a switch coupled between the gate control output and a voltage reference, and the gate control circuit configured to:
receive, via the gate control input, an anode-cathode difference voltage between the first current terminal and the second current terminal; and
based on the anode-cathode difference voltage exceeding a threshold voltage, close the switch to connect the gate to the voltage reference.

16. The controller circuit of claim 15, wherein the switch is a first switch, the threshold voltage is a first threshold voltage, and the gate control circuit includes:
an amplifier having an amplifier output and first and second amplifier inputs, the first amplifier input coupled to the gate control input, and the amplifier configured to generate a third voltage, in which the third voltage is linearly related a difference between the difference voltage at the first amplifier input and a second threshold voltage at the second amplifier input, and the second threshold voltage is lower than the first threshold voltage; and
a second switch coupled between the amplifier output and the gate control output;
in which the gate control circuit is configured to:
close the first switch for a pre-determined duration; and
after the duration: open the first switch; and close the second switch to provide the third voltage at the gate control output.

17. The controller circuit of claim 16, wherein the amplifier is configured to provide the third voltage to maintain the difference voltage at the second threshold.

18. The controller circuit of claim 16, wherein the gate control circuit includes:
a third switch adapted to be coupled between the first current terminal and the gate; and
a reverse current block (RCB) circuit having an RCB input and an RCB output, the RCB input coupled to the gate control input, the RCB output coupled to the third switch, and the RCB circuit is configured to provide a control signal based on whether the difference voltage exceeds the first threshold voltage.

19. The controller circuit of claim 17, wherein the control signal is a first control signal, and the gate control circuit includes:
a forward conduction (FC) control circuit having an FC input and first and second FC outputs, the FC input coupled to the RCB output, the second FC output coupled to the second switch, and the FC control circuit configured to:
based on the first control signal, determine a start time and an end time of the duration;
provide, at the first FC output, a second control signal and a third control signal indicating, respectively, the start time and the end time of the duration; and
after the duration ends, provide, at the second FC output and based on the second decision signal, a fourth control signal based on whether the difference voltage exceeds the first threshold voltage; and
a pulse generator having a pulse generator input and a pulse generator output, the pulse generator input coupled to the first FC output, the pulse generator output coupled to the first switch, and the pulse generator configured to:
generate a pulse signal based on the first and second control signals; and
provide the pulse signal at the pulse generator output.

20. A method comprising:
receiving a first voltage via a first terminal of a controller circuit, the first terminal being coupled to a first current terminal of a transistor;
receiving a second voltage via a second terminal of the controller circuit, the second terminal being coupled to a second diffusion of the transistor; and
based on the first voltage and the second voltage, closing a switch between a voltage reference and a third terminal of the controller circuit coupled to a gate of the transistor, in which a voltage of the gate is set by the voltage reference to form a conduction channel between the first current terminal and the second current terminal.

* * * * *